US006883008B2

(12) United States Patent
Crivella et al.

(10) Patent No.: US 6,883,008 B2
(45) Date of Patent: Apr. 19, 2005

(54) SYSTEM FOR UTILIZING AUDIBLE, VISUAL AND TEXTUAL DATA WITH ALTERNATIVE COMBINABLE MULTIMEDIA FORMS OF PRESENTING INFORMATION FOR REAL-TIME INTERACTIVE USE BY MULTIPLE USERS IN DIFFERENT REMOTE ENVIRONMENTS

(75) Inventors: Arthur Ray Crivella, Pittsburgh, PA (US); Wayne Jacob West, North Huntingdon, PA (US)

(73) Assignee: ASE Edge, Inc., Pittsburgh, PA (US)

( * ) Notice: Subject to any disclaimer, the term of this patent is extended or adjusted under 35 U.S.C. 154(b) by 300 days.

(21) Appl. No.: 09/919,468

(22) Filed: Jul. 31, 2001

(65) Prior Publication Data

US 2003/0028534 A1 Feb. 6, 2003

(51) Int. Cl.[7] .............................................. G06F 17/30
(52) U.S. Cl. .............................. 707/102; 707/10; 704/1
(58) Field of Search .................... 707/1–10, 100–104.1, 707/200–206; 704/1; 705/1

(56) References Cited

U.S. PATENT DOCUMENTS

| 5,802,518 A | 9/1998 | Karaev et al. ................... 707/9 |
| 5,899,995 A | 5/1999 | Millier et al. ................ 707/102 |
| 6,128,620 A | 10/2000 | Pissanos et al. ............ 707/102 |
| 6,377,949 B1 * | 4/2002 | Gilmour ....................... 707/10 |

FOREIGN PATENT DOCUMENTS

| WO | WO 00 23926 A | 4/2000 |
| WO | WO 01 04791 A | 1/2001 |

OTHER PUBLICATIONS

Kun–Lung Wu et al., Personalization with Dynamic Profiler, Jun. 21–22, 2001, Advanced Issues of E–Commerce and Web–Based Information Systems, WECWIS 2001, Third International Workshop, 12–20.*

Klas W et al: "Cardio–OP: Gallery of Cardiac Surgery", Multimedia Computing and Systems, 1999. IEEE International Conference on Florence, Italy Jun. 7–11, 1999, Los Alamitos, CA, USA IEEE Comput. Soc, US, pp. 1092–1095, XP010519571, ISBN: 0–7695–0253–9 the whole document.

Shubert P et al: "Organizational design of an IT–based knowledge system: the NetAcademy concept" System Sciences, 1998., Proceedings ofthe Thirty–First Hawaii International Conference on Kohala Coast, HI, USA Jan. 6–9, 1998., Los Alamitos, CA USA, IEEE Comput. Soc, US, pp. 175–184, XP010262879, ISBN: 0–8186–8255–8 the whole document.

* cited by examiner

Primary Examiner—Shahid Alam
Assistant Examiner—Jean Bolte Fleurantin
(74) Attorney, Agent, or Firm—Christine W. Trebilcock; Cohen & Grisby, P.C.

(57) ABSTRACT

A system is provided for utilizing audible, visual and textual data with multimedia forms of presenting information for real-time interactive use by multiple users in different remote environments. Library science concepts are utilized to uniformly categorize the information managed by the system, and linguistics concepts are implemented for defining information acquisition, exchange and workflow to permit categorization of the managed information using the library science concept. Managed information is stored in a database according to a unique schema which implements this categorization. Computer technology is combined with the science of media production for presentation of the managed information in various multimedia audible, visual and textual digital forms and formats, and computer software allows the system to work over a computer network to permit interactive, multidirectional, multimedia digital data communications originated from and made instantaneously available anywhere in the world to or from any number of different locations simultaneously.

15 Claims, 48 Drawing Sheets

ASE Edge Knowledge Pyramid

Figure 1:
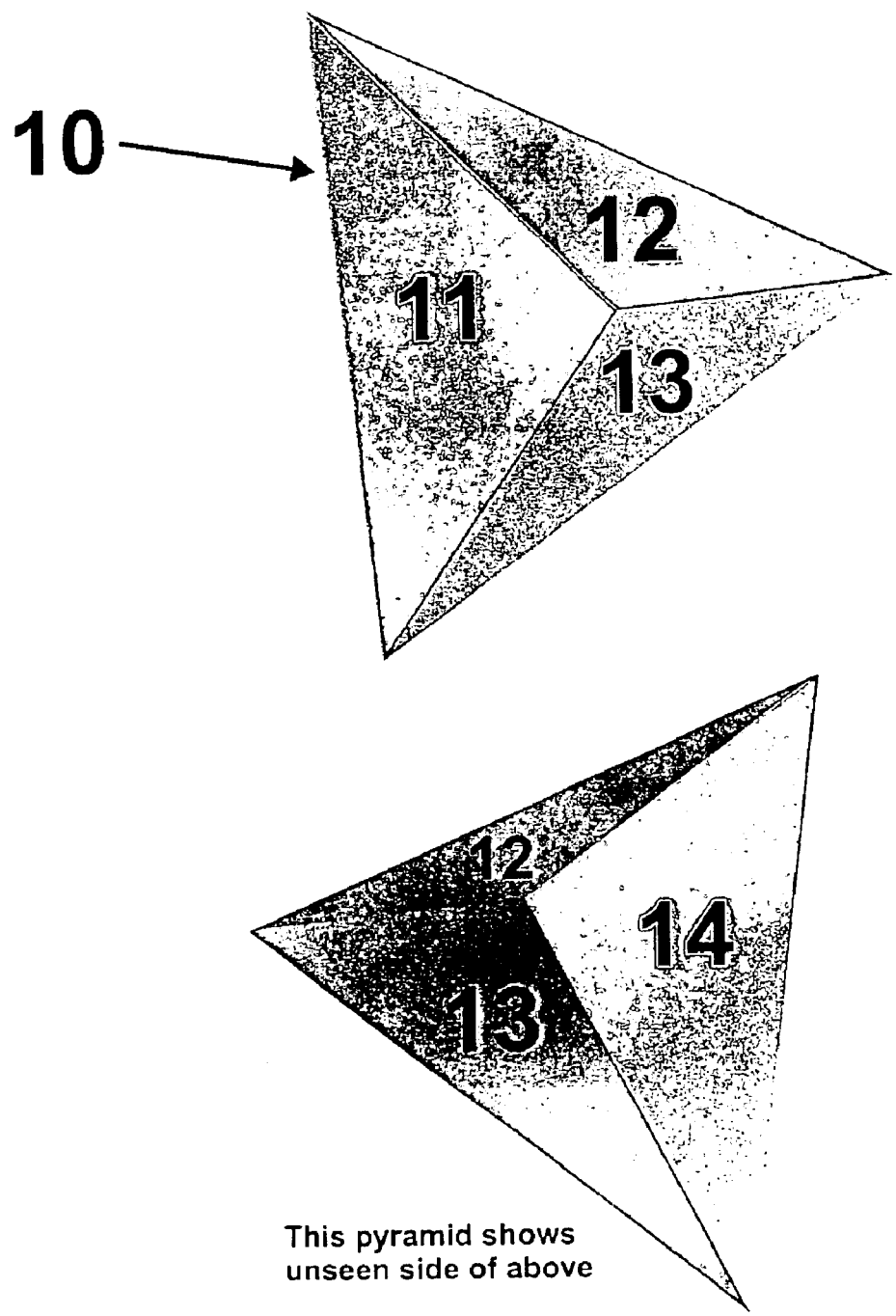
Figure 2:
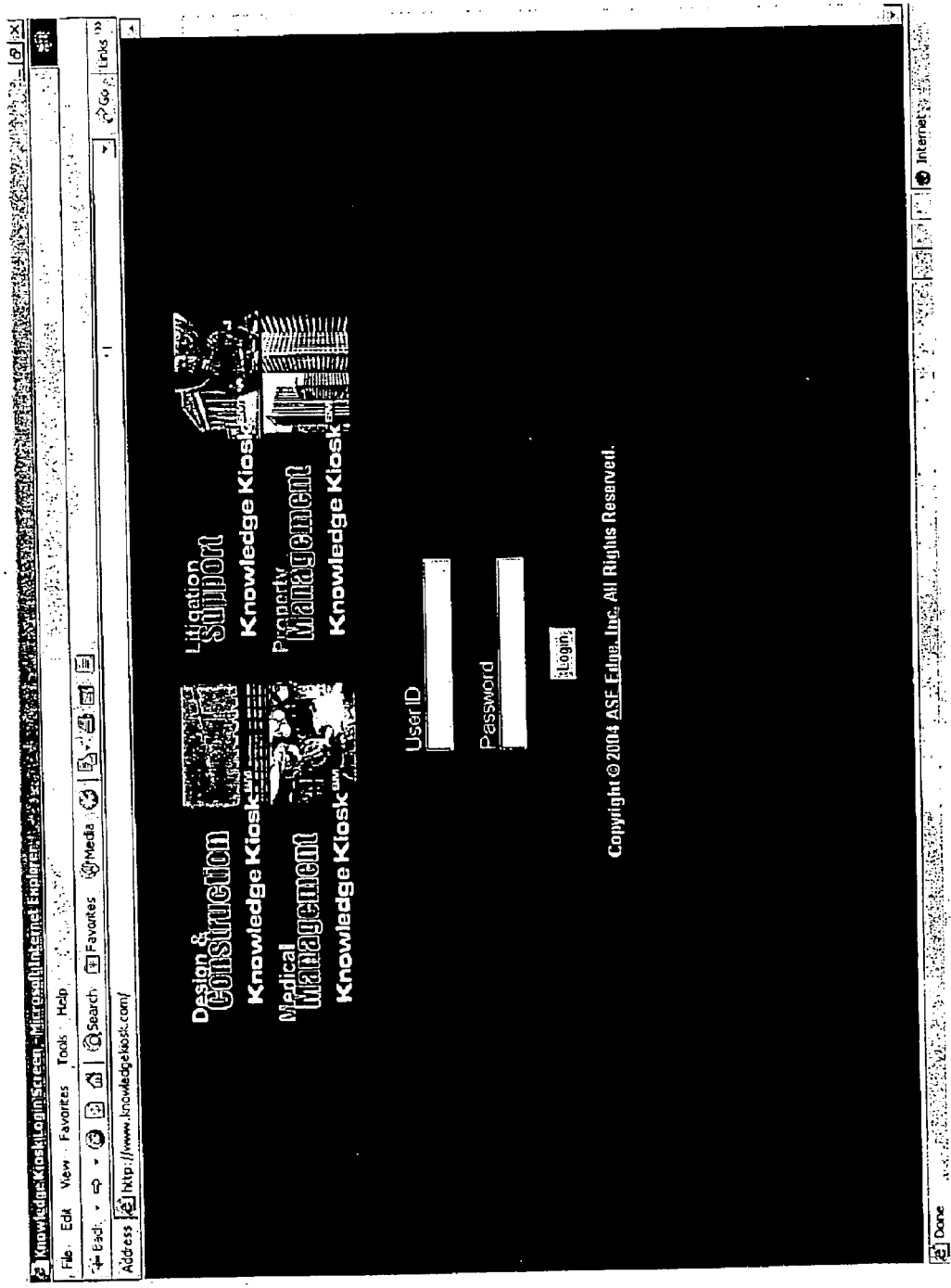
Figure 3:
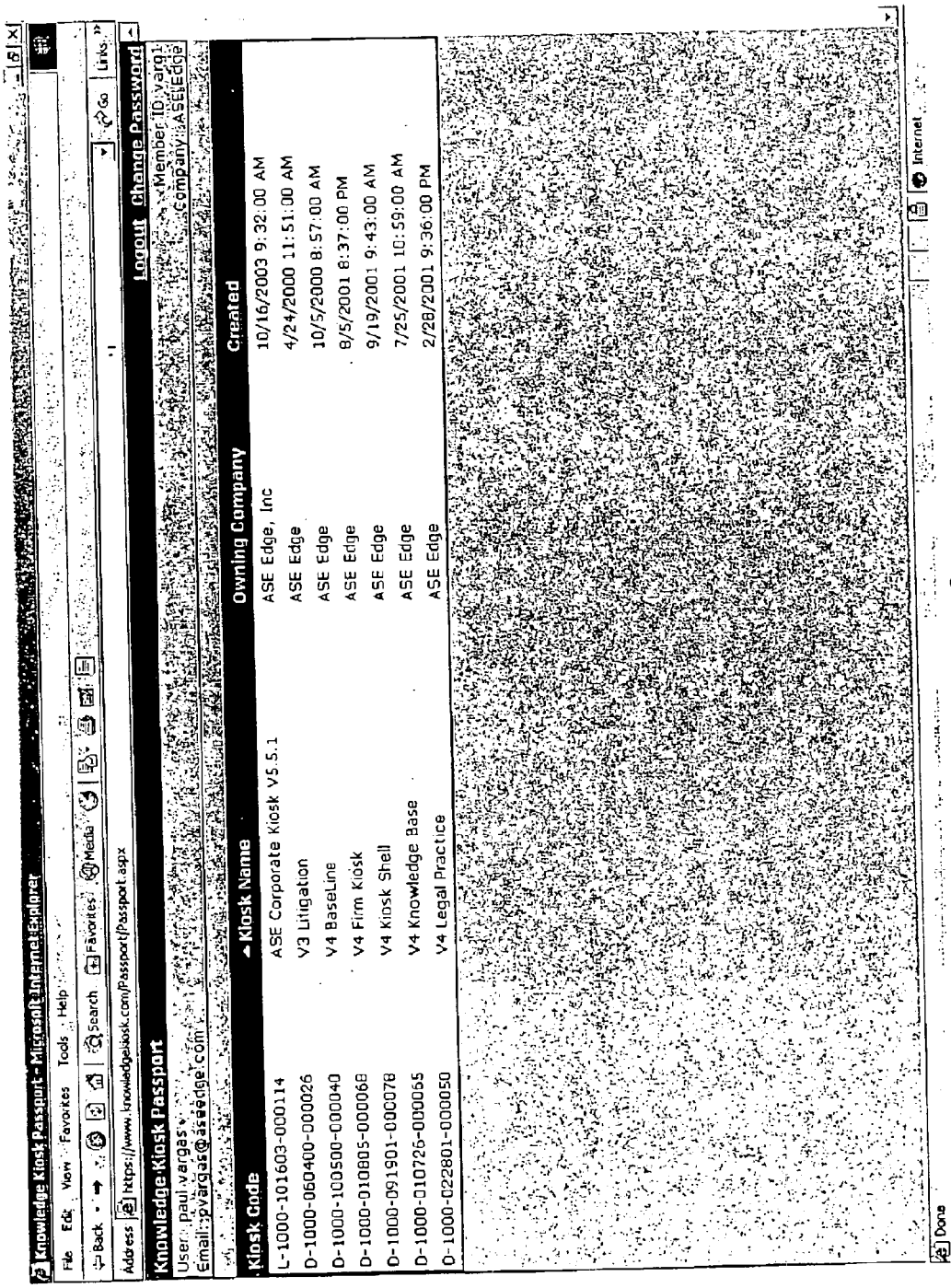
Figure 4:
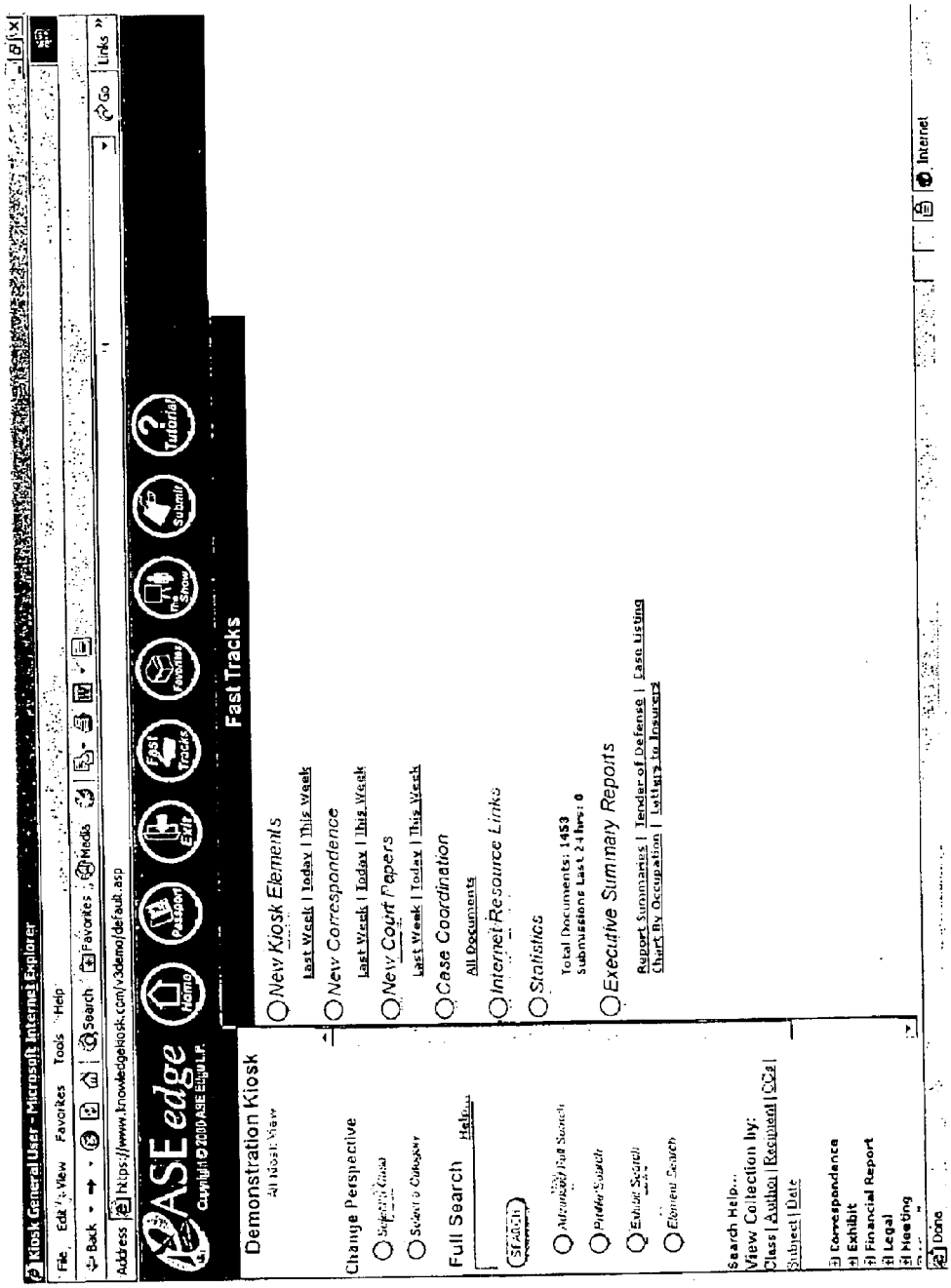
Figure 5:
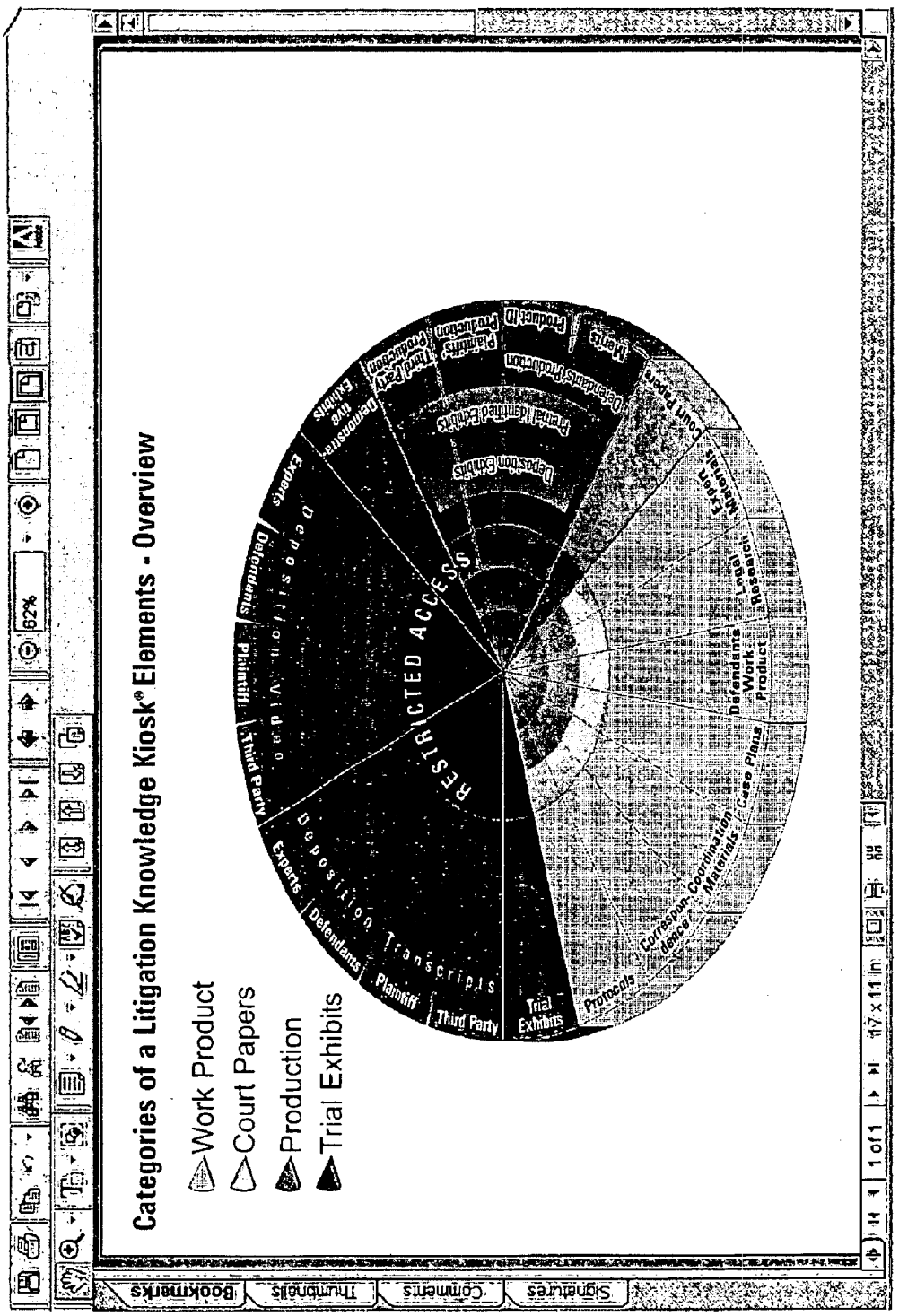
Figure 6:
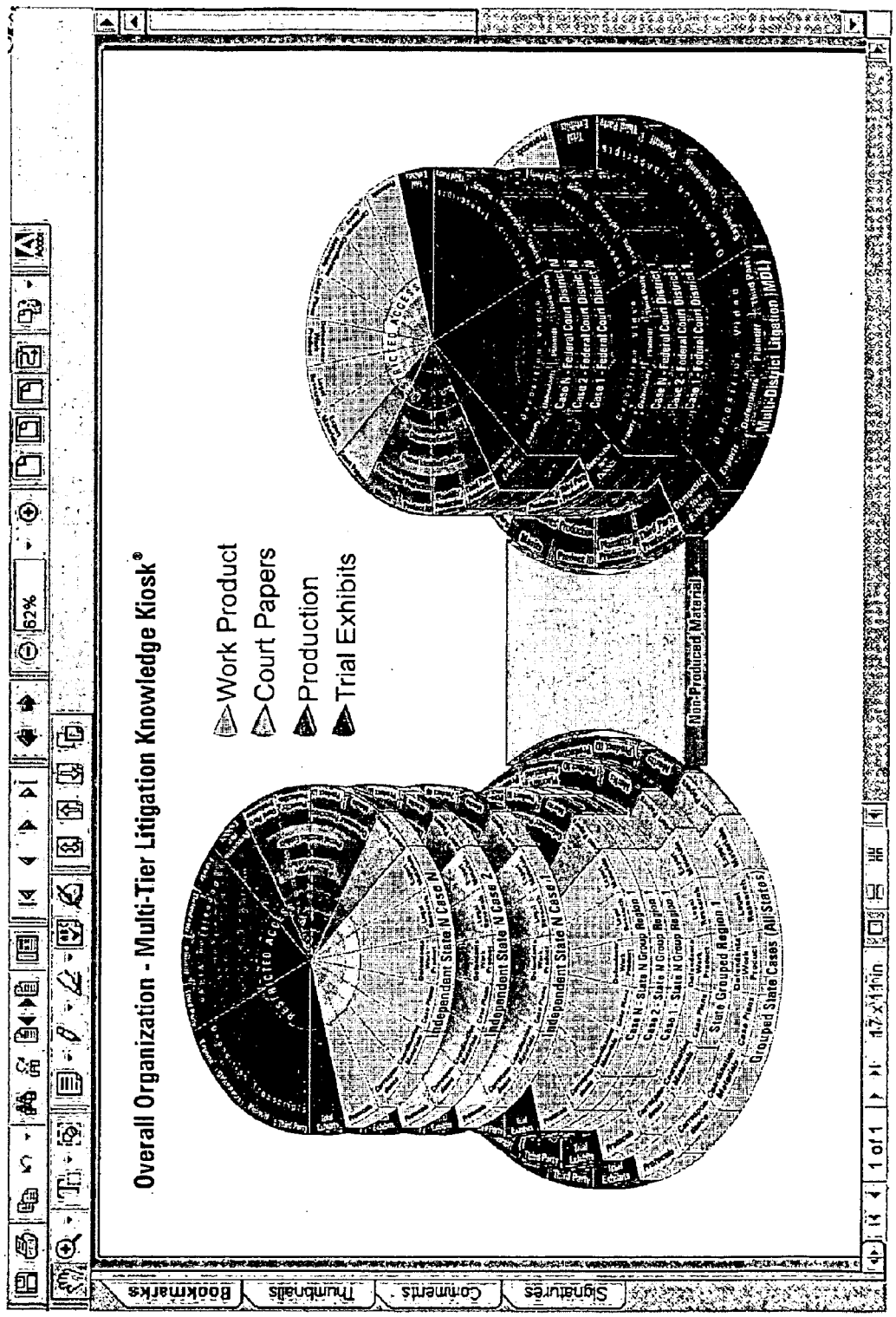
Figure 8A:
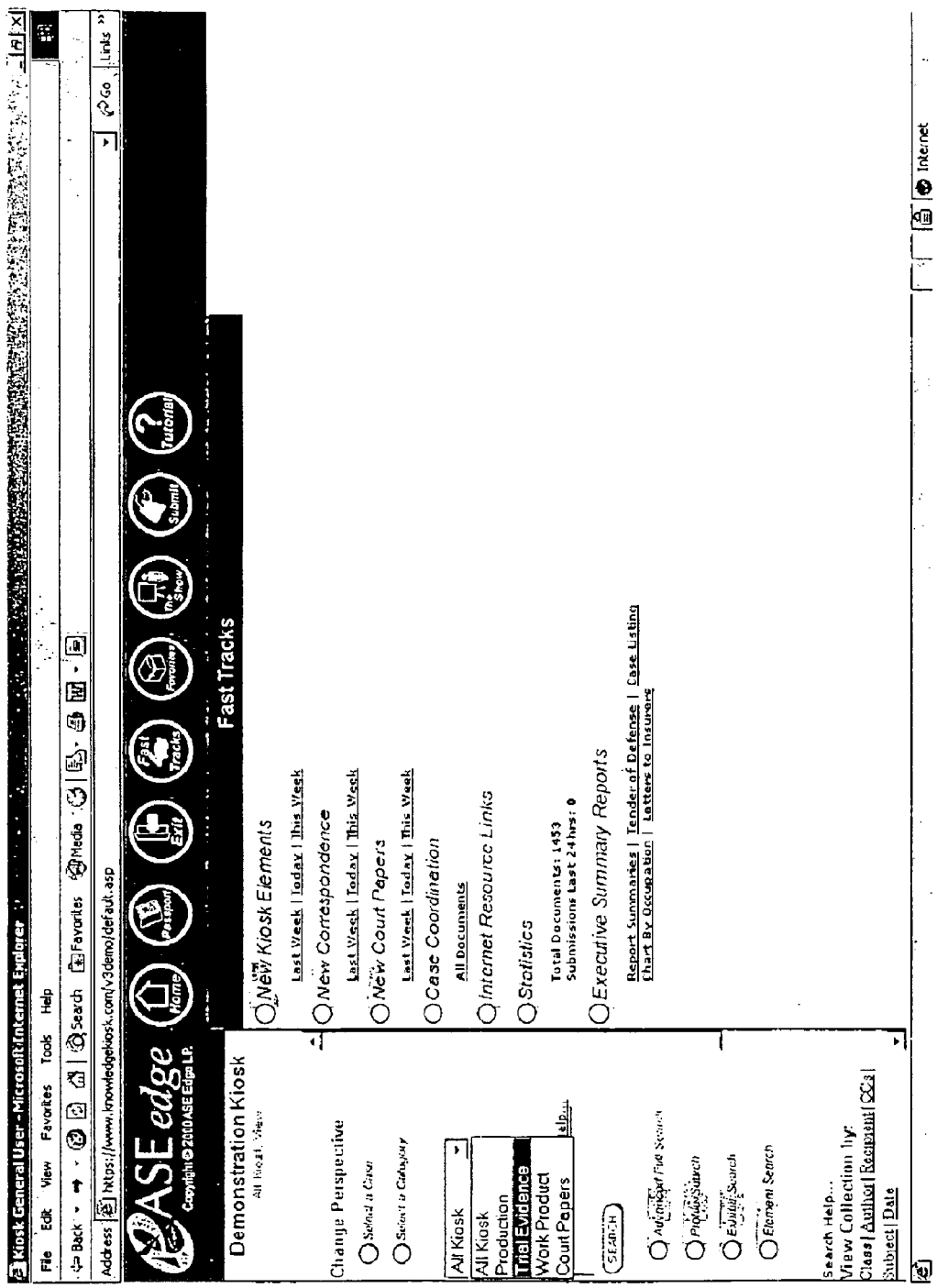
Figure 8B:
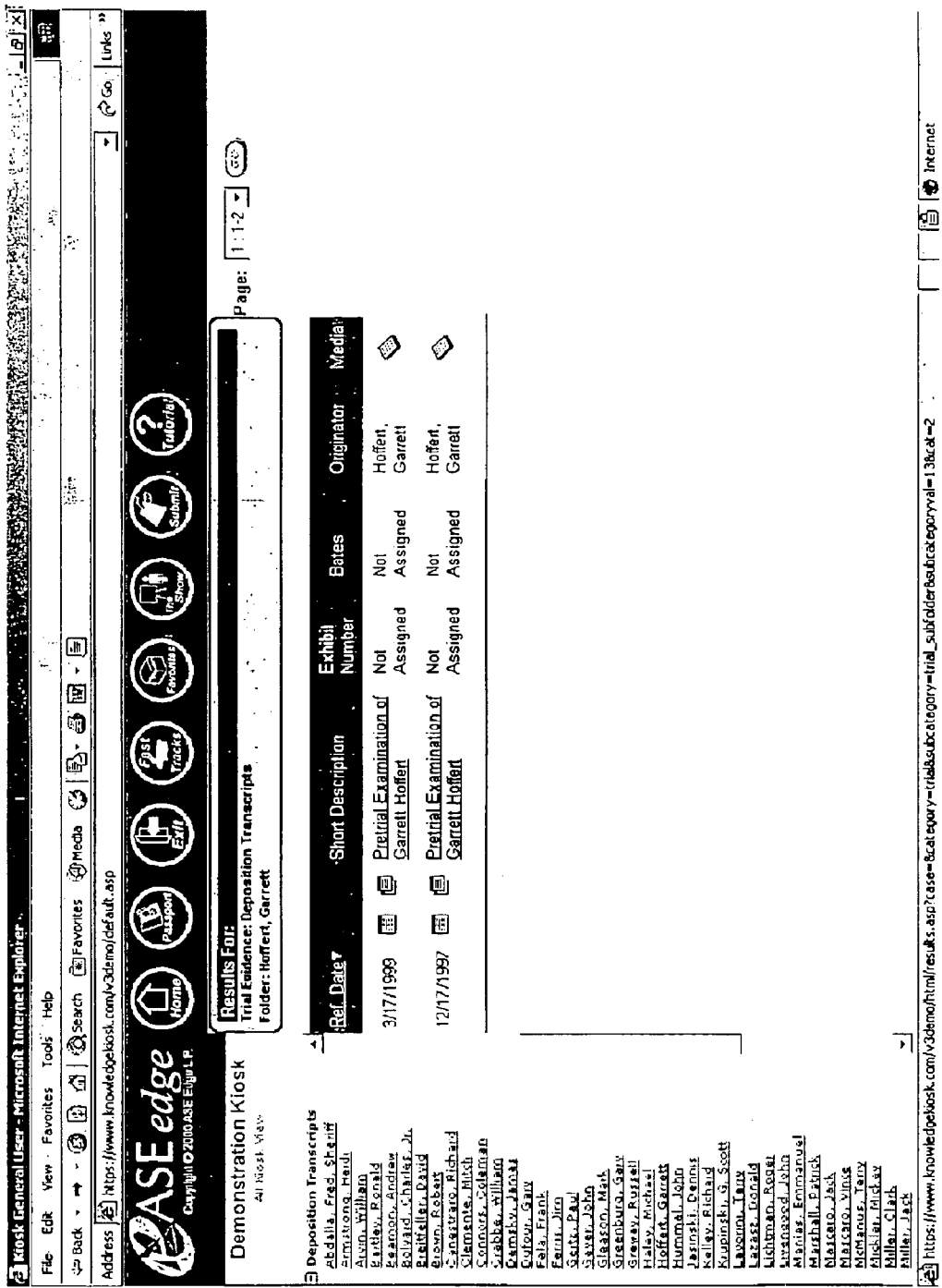
Figure 8C:
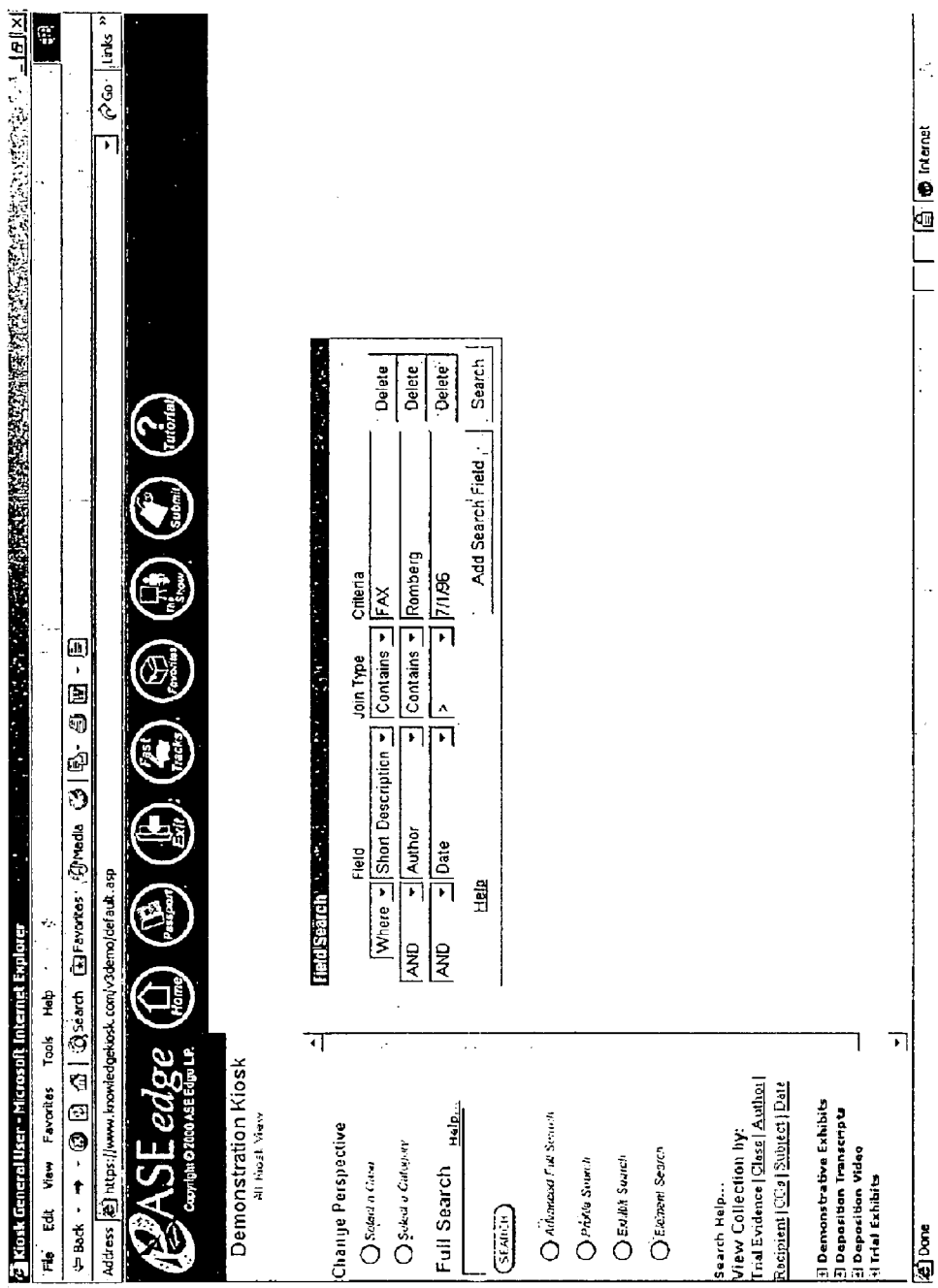
Figure 8D:
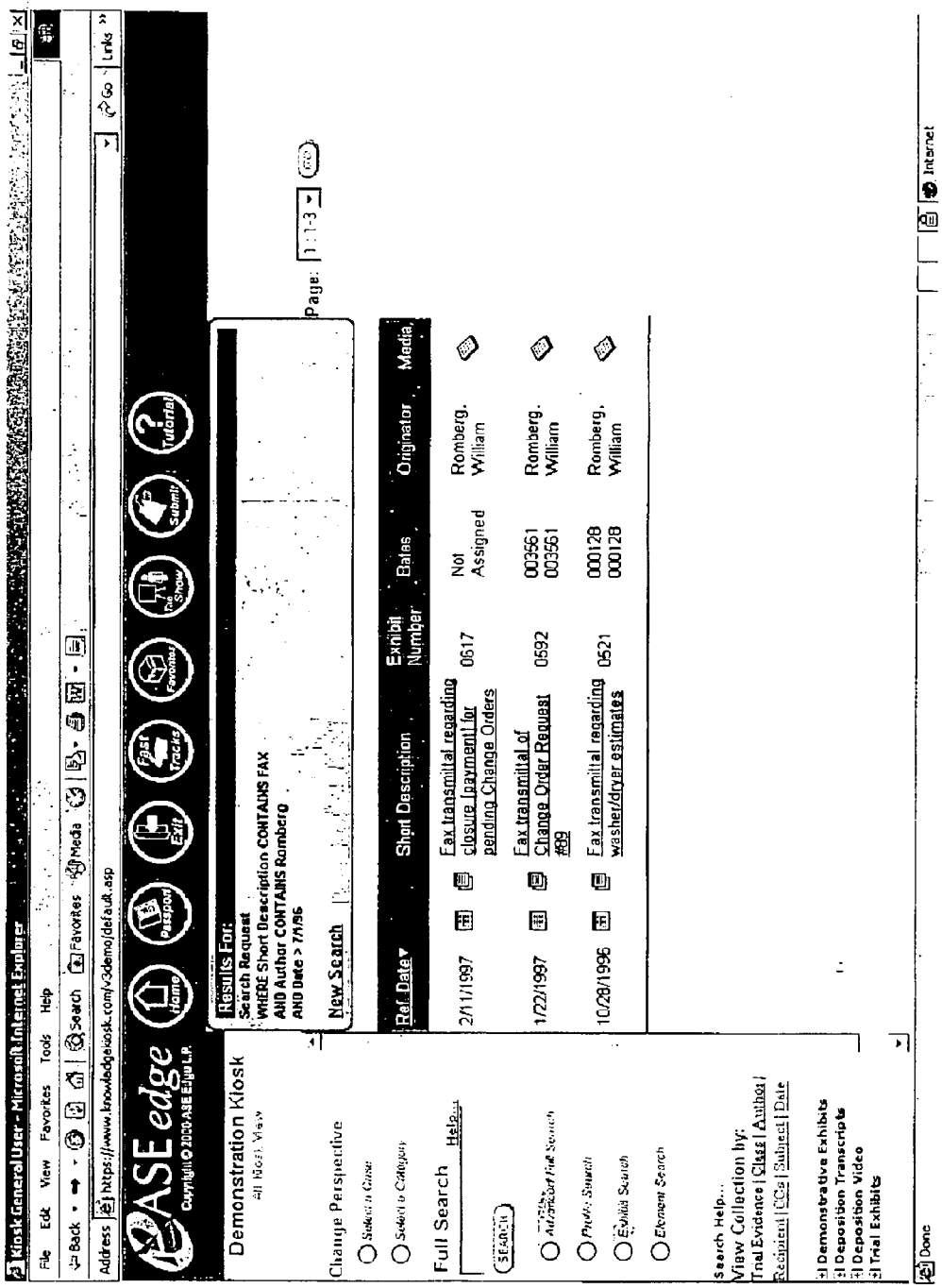
Figure 8E:
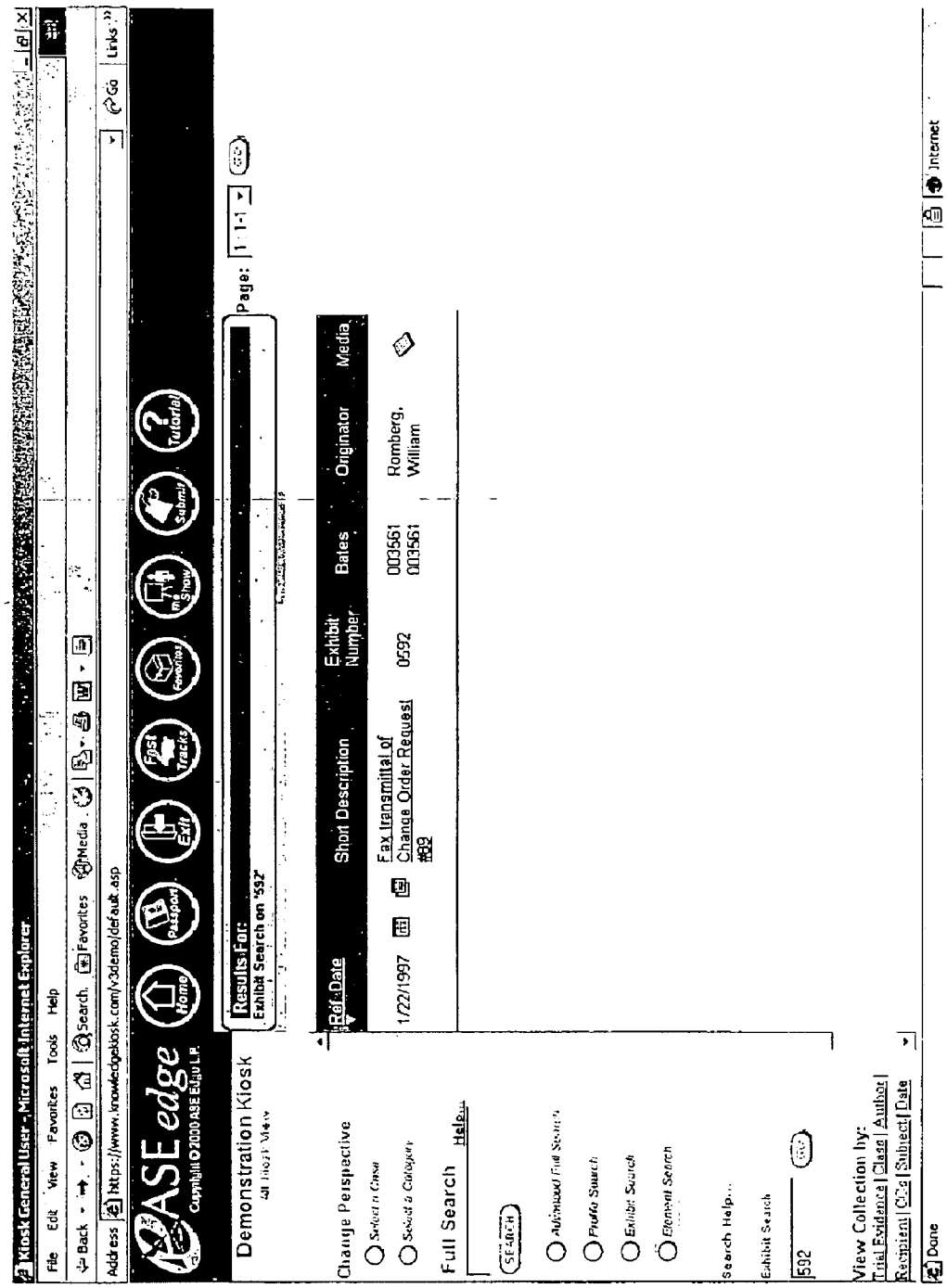
Figure 8F:
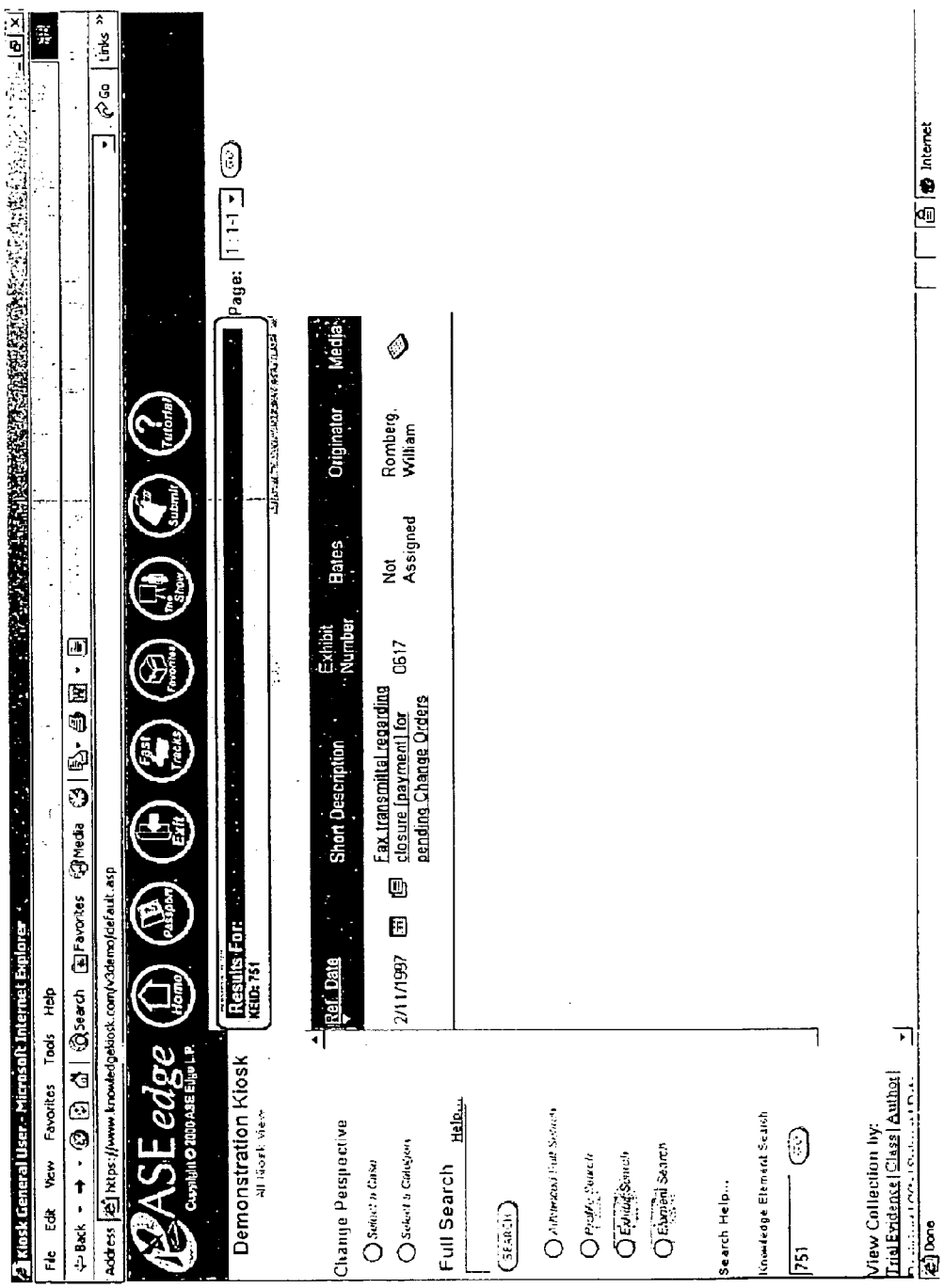
Figure 9:
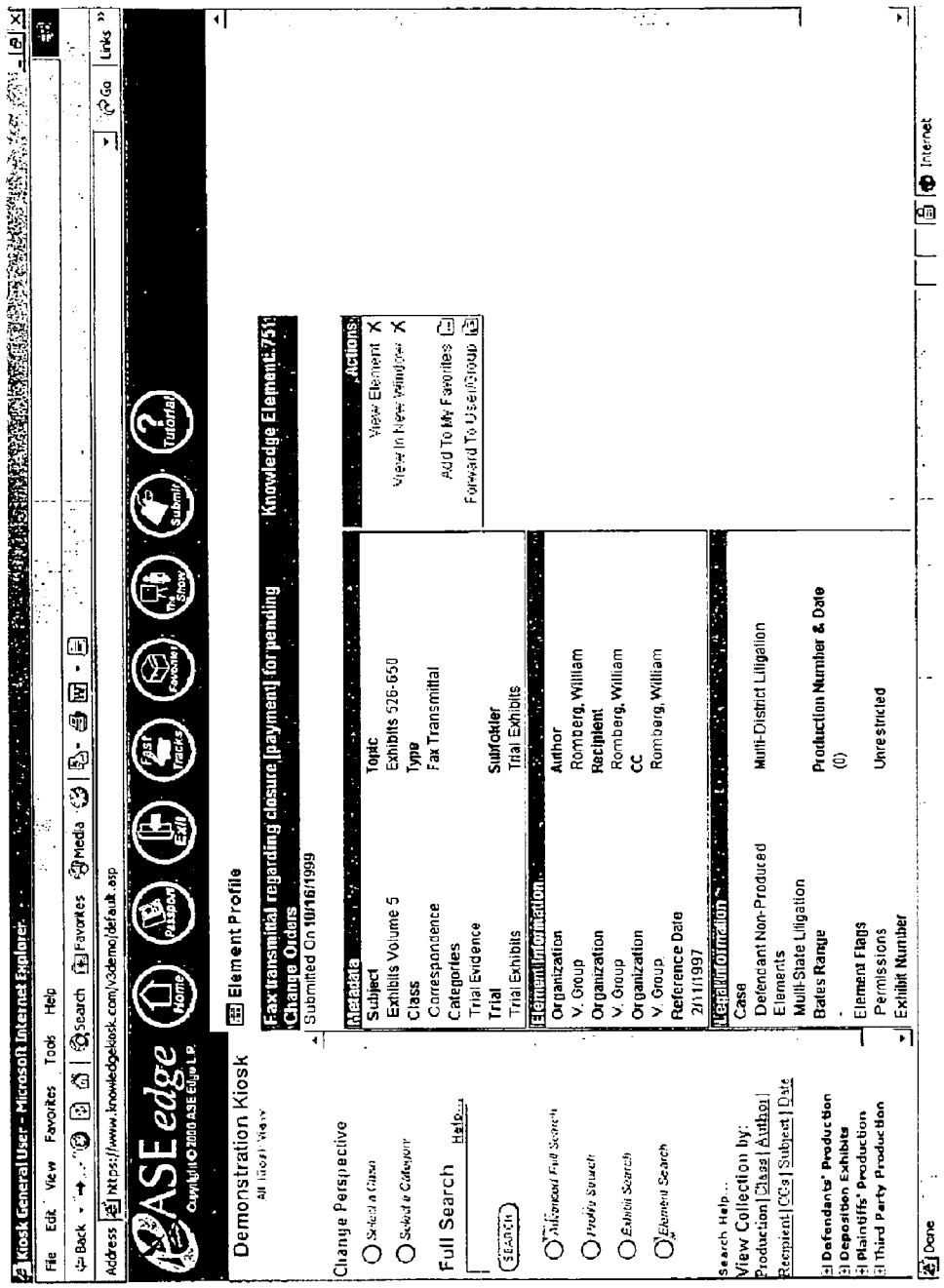
Figure 10A:
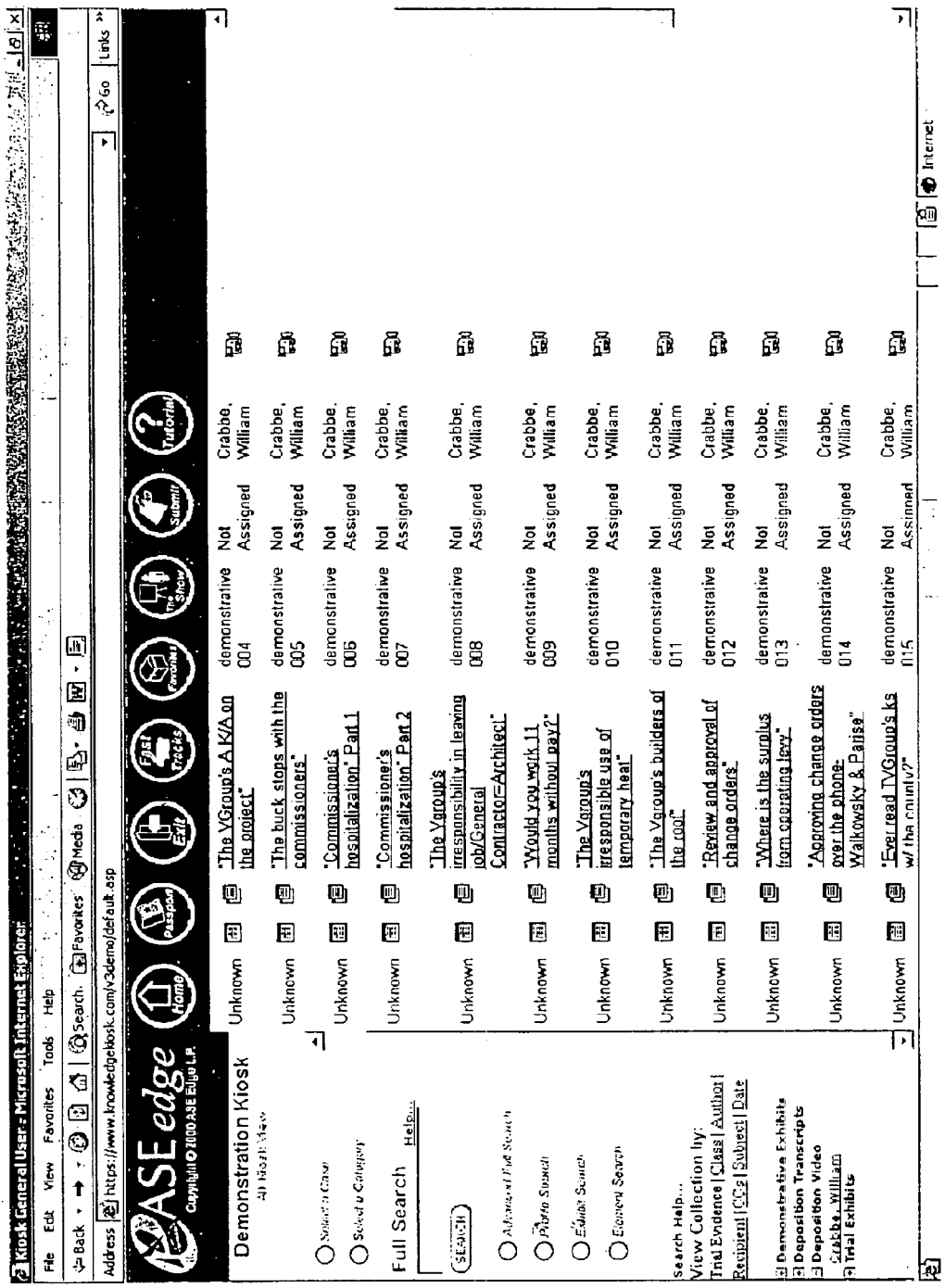
Figure 10B:
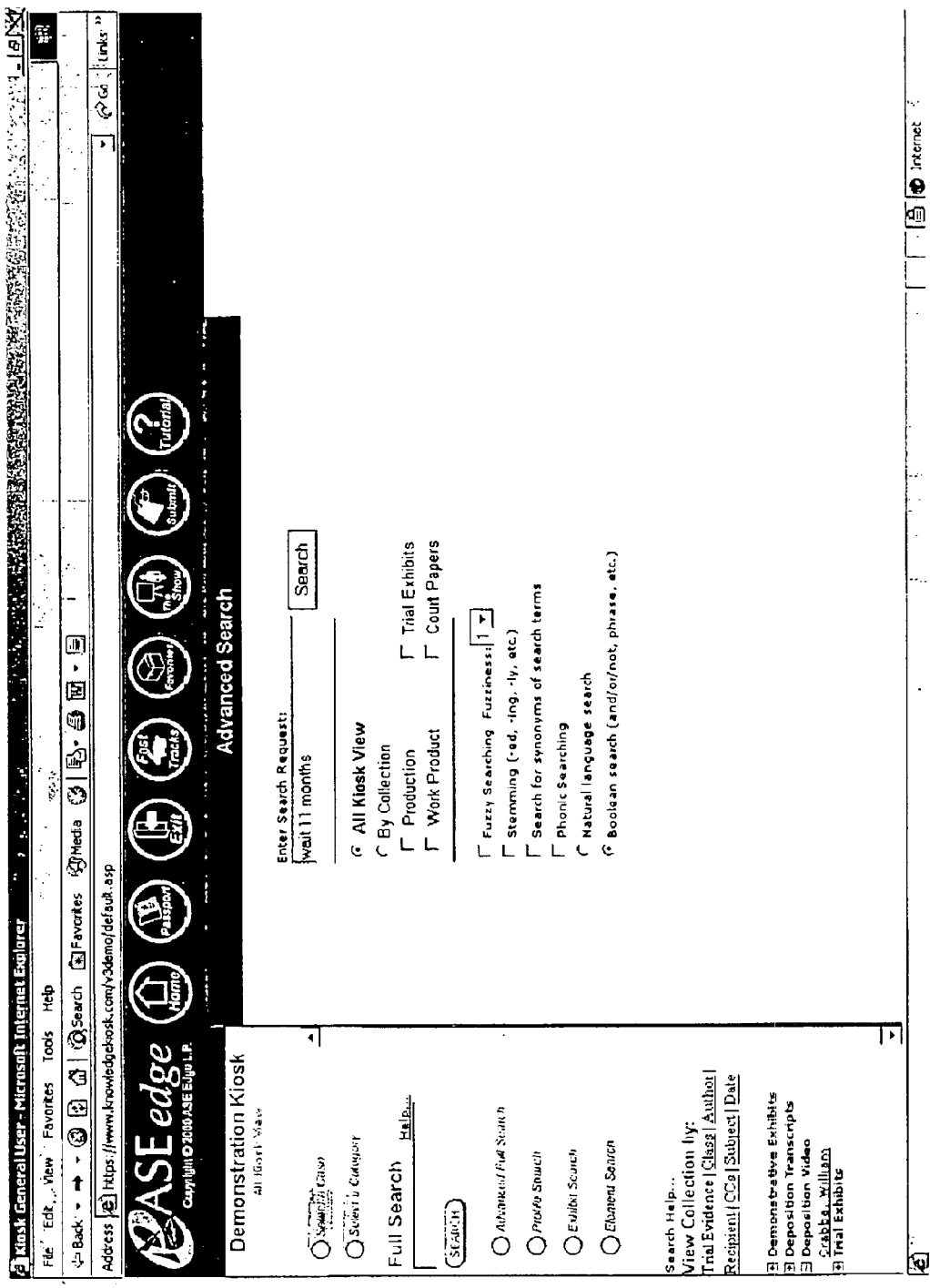
Figure 10C:
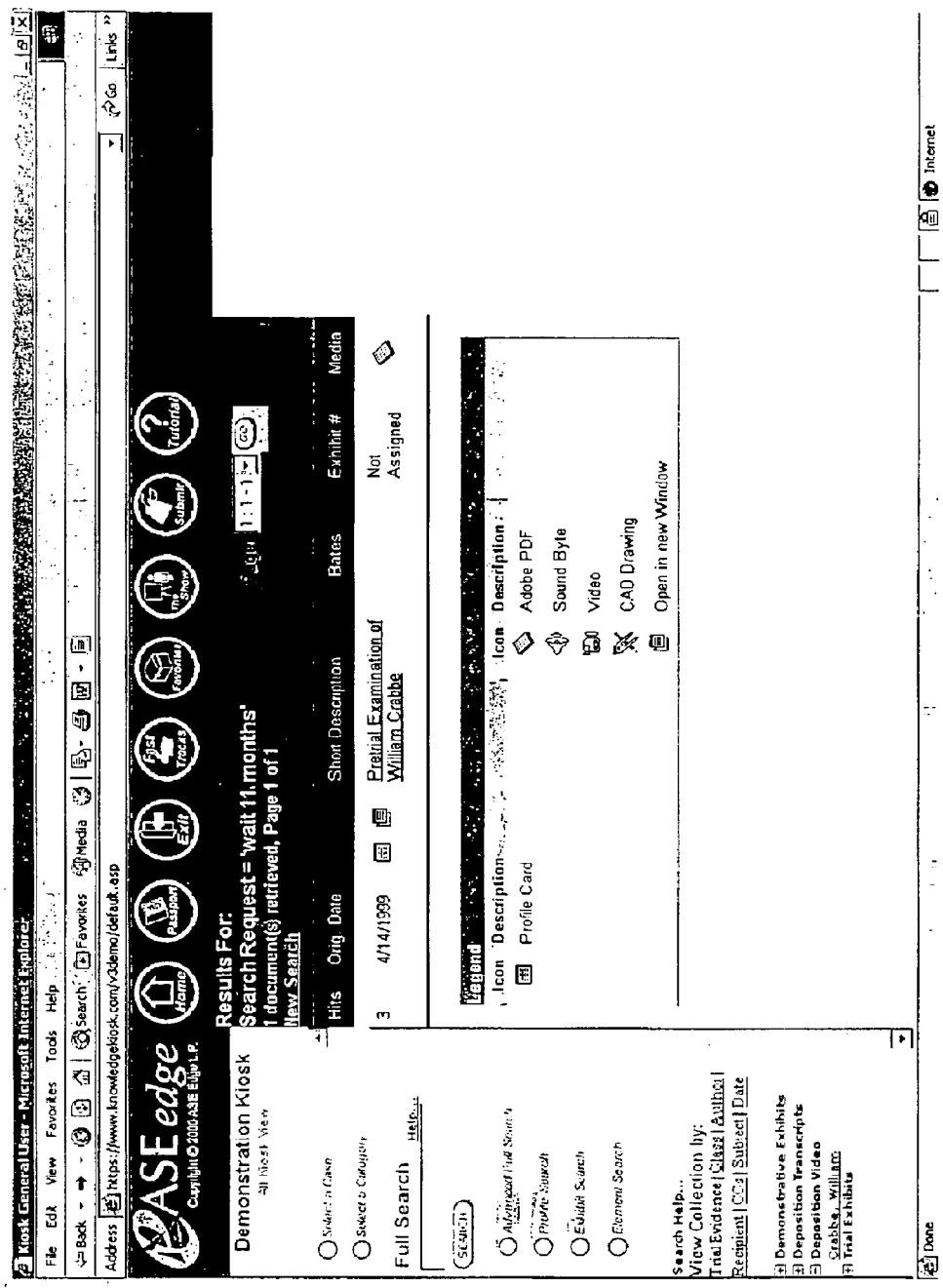
Figure 10D:
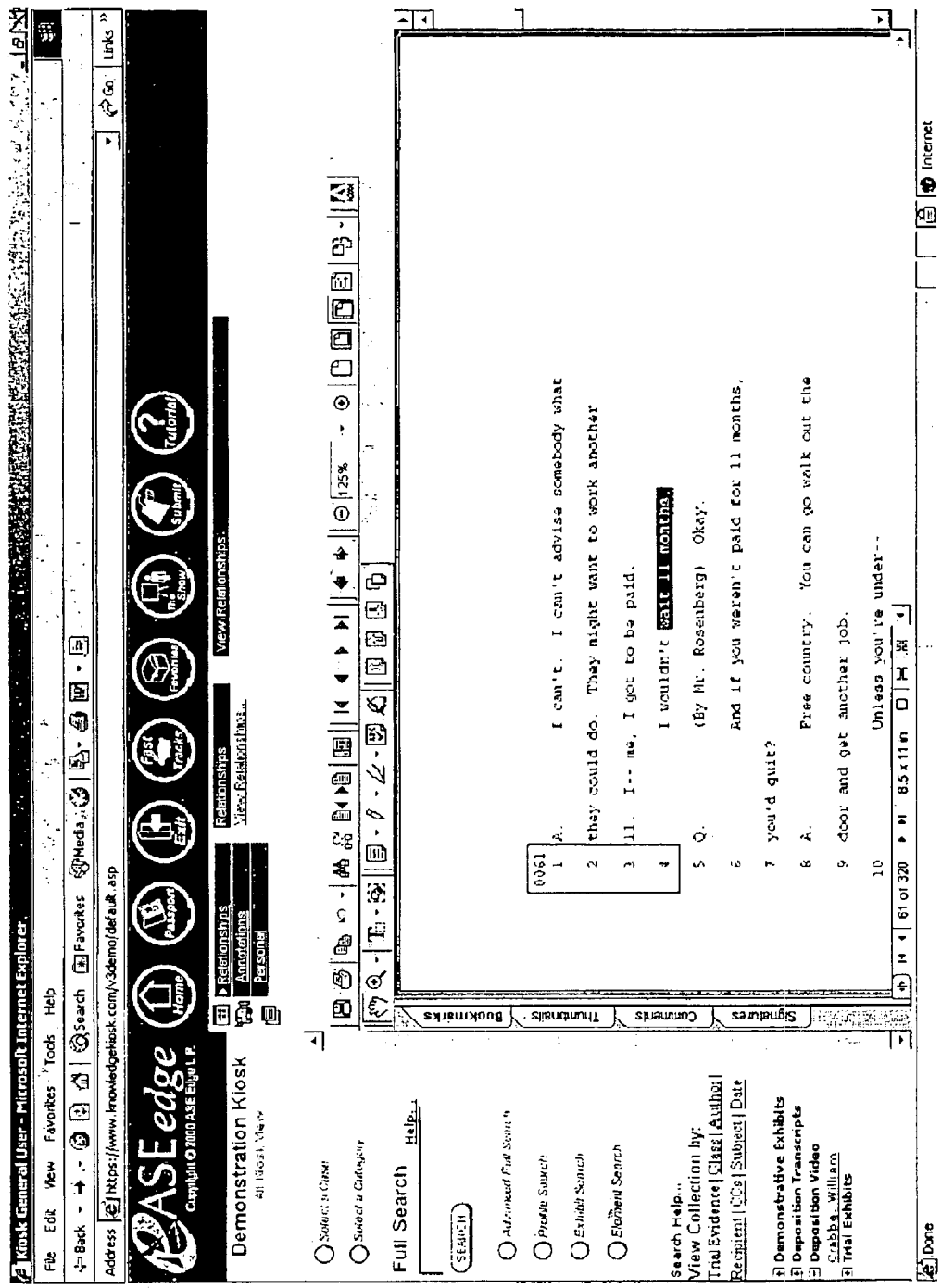
Figure 11A:
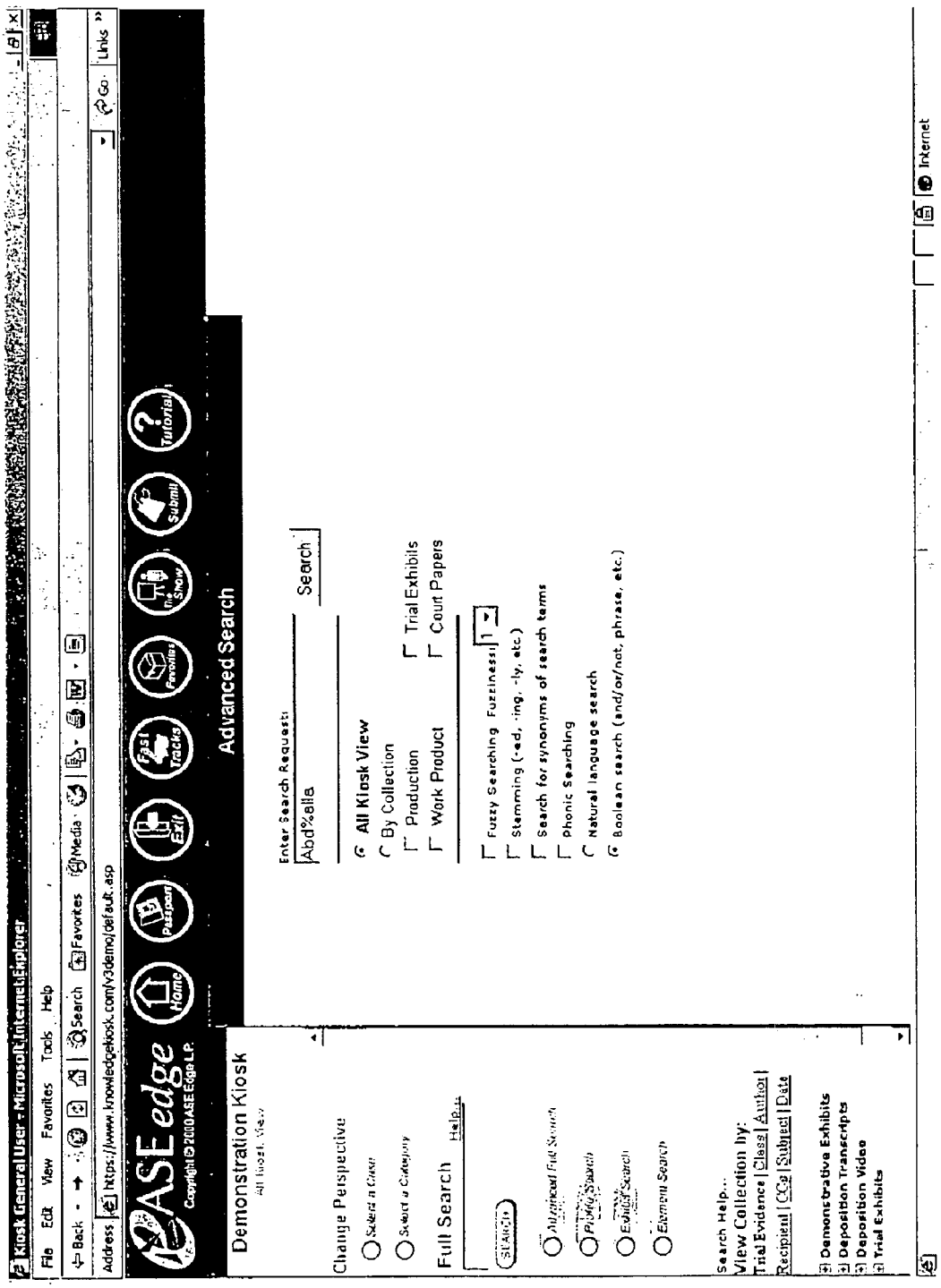
Figure 11C:
Figure 11D:
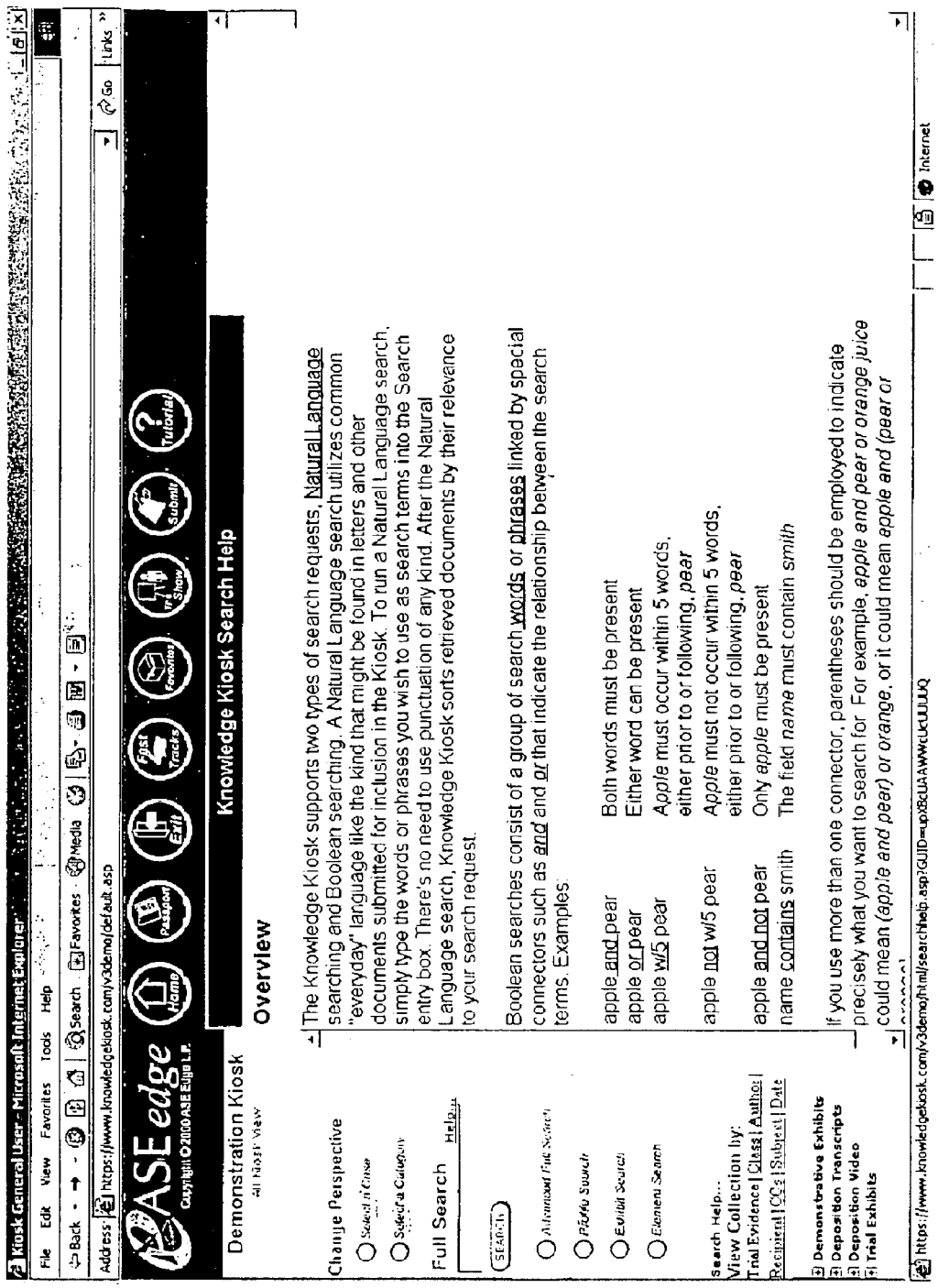
Figure 12A:
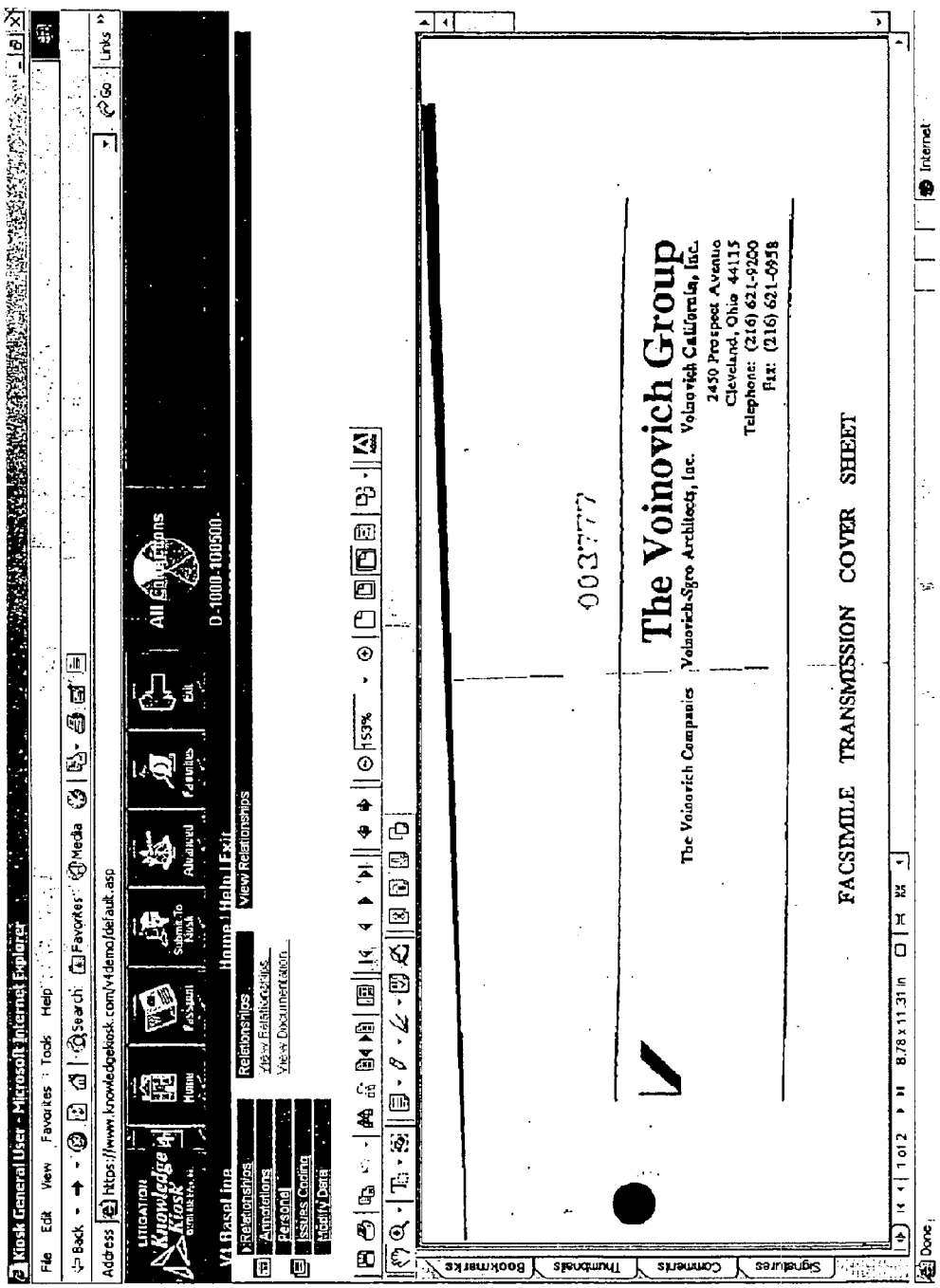
Figure 12B:
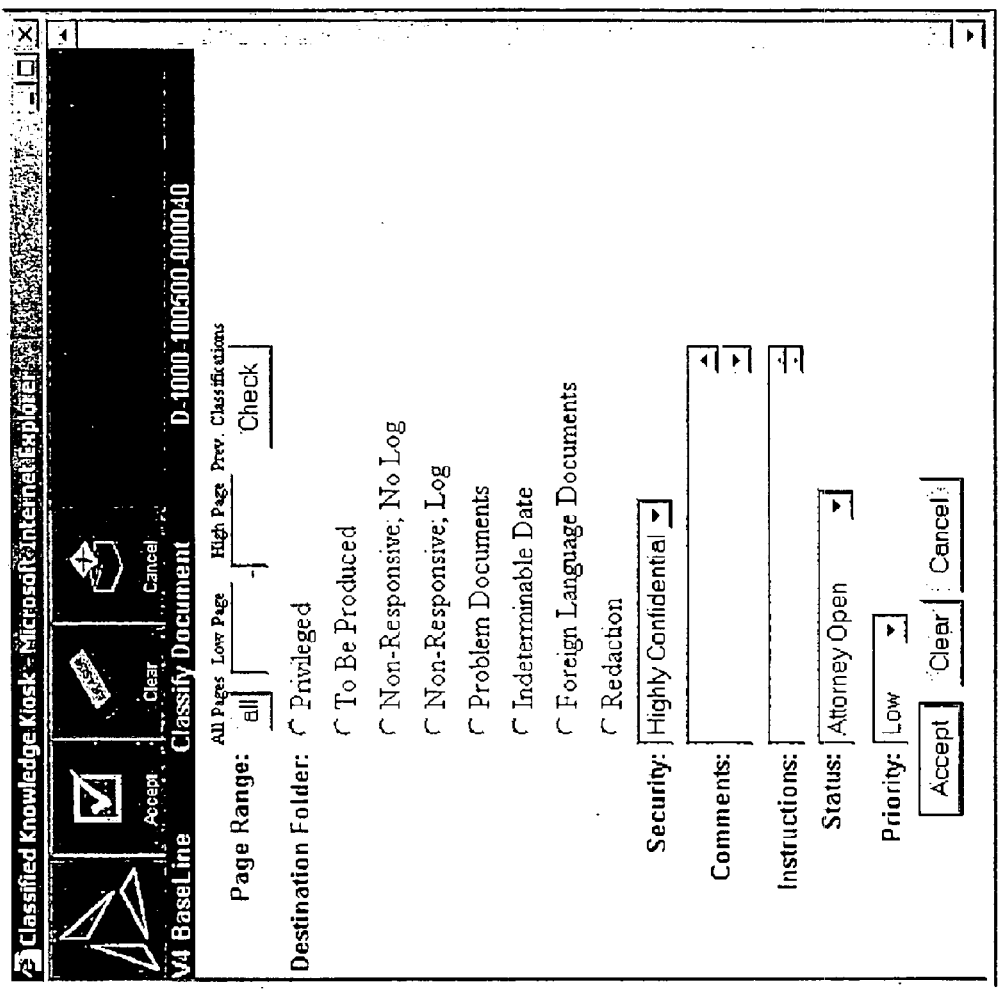
Figure 12C:
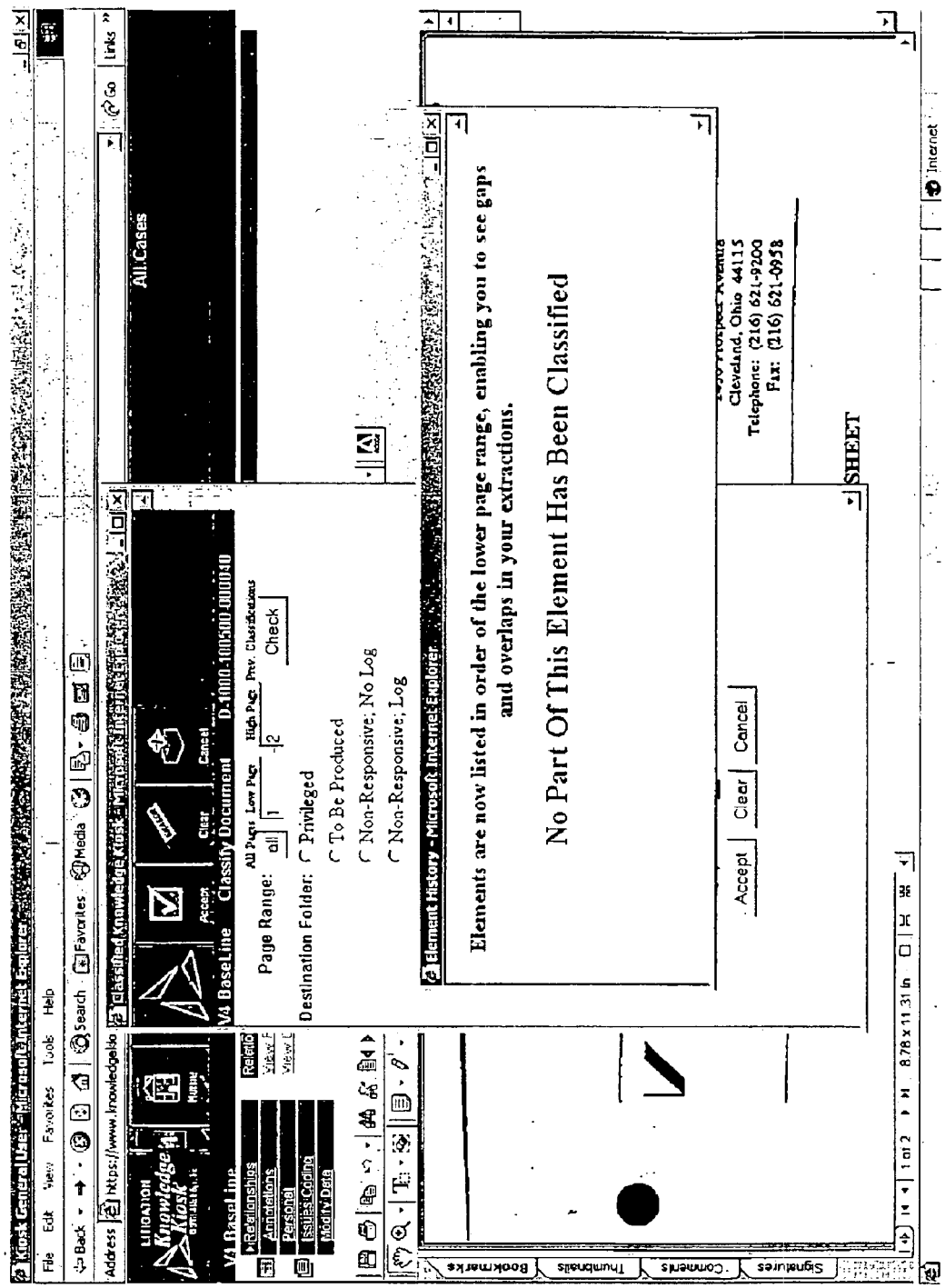
Figure 12D:
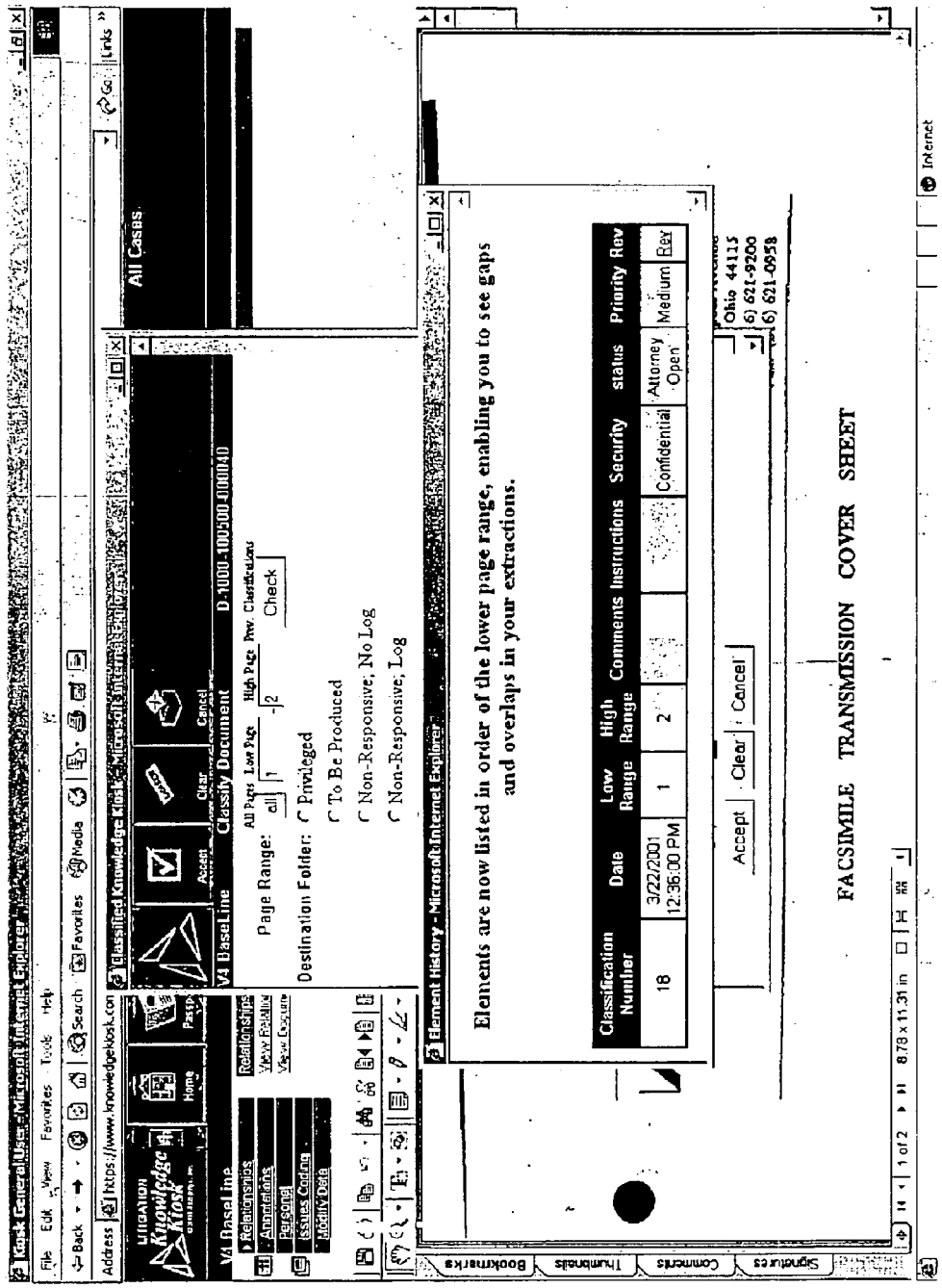
Figure 12E:
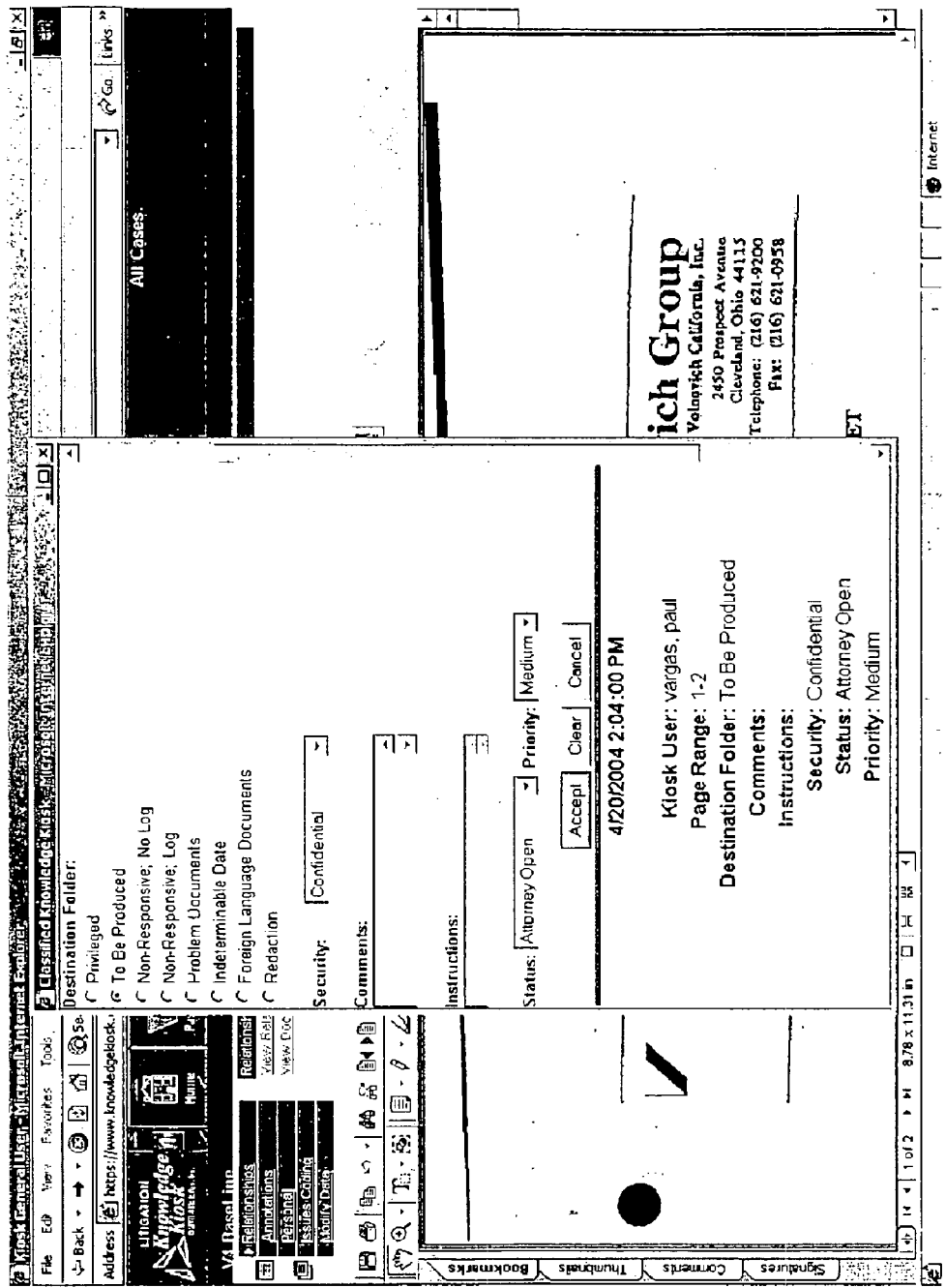
Figure 13A:
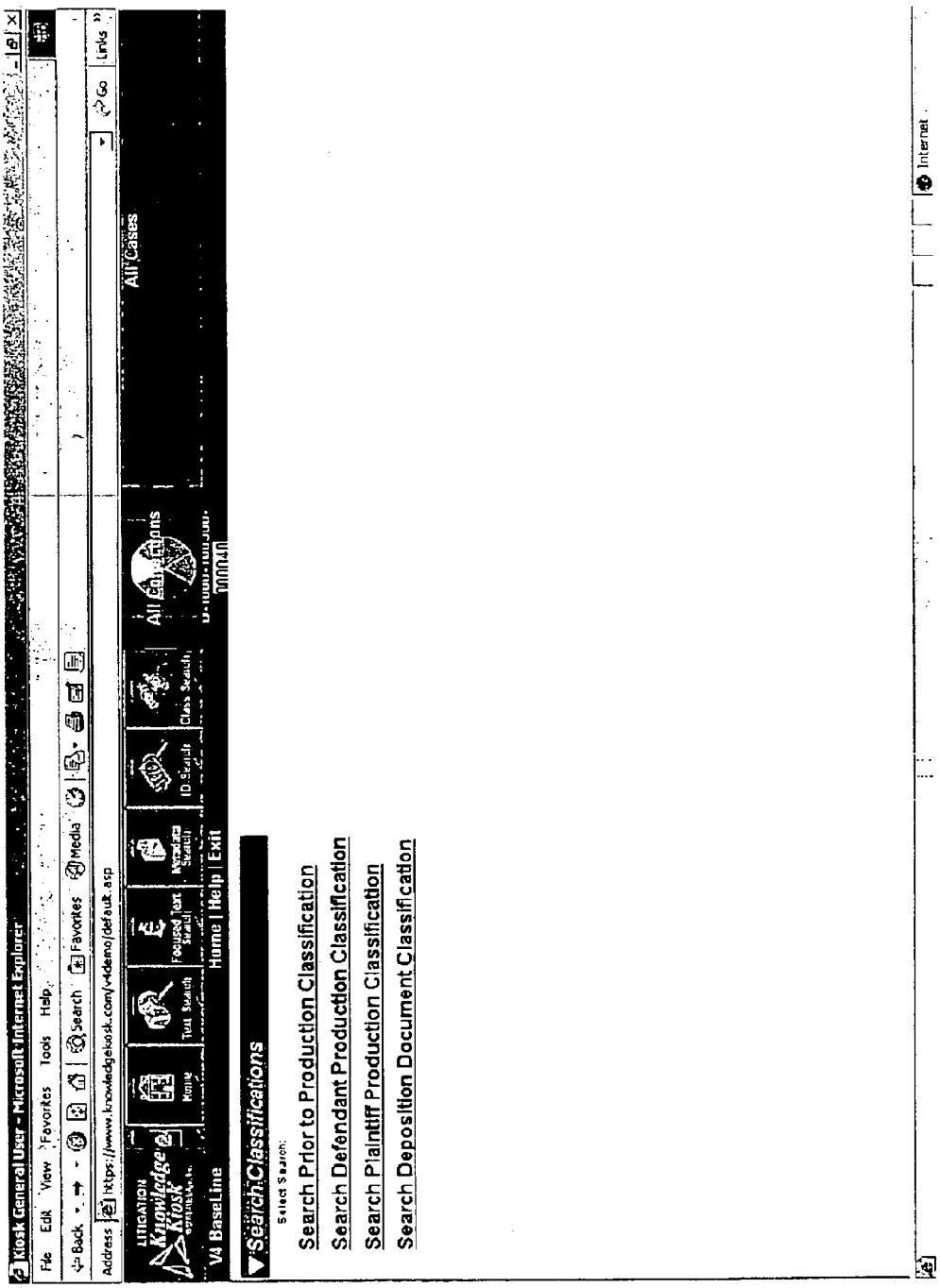
Figure 13B:
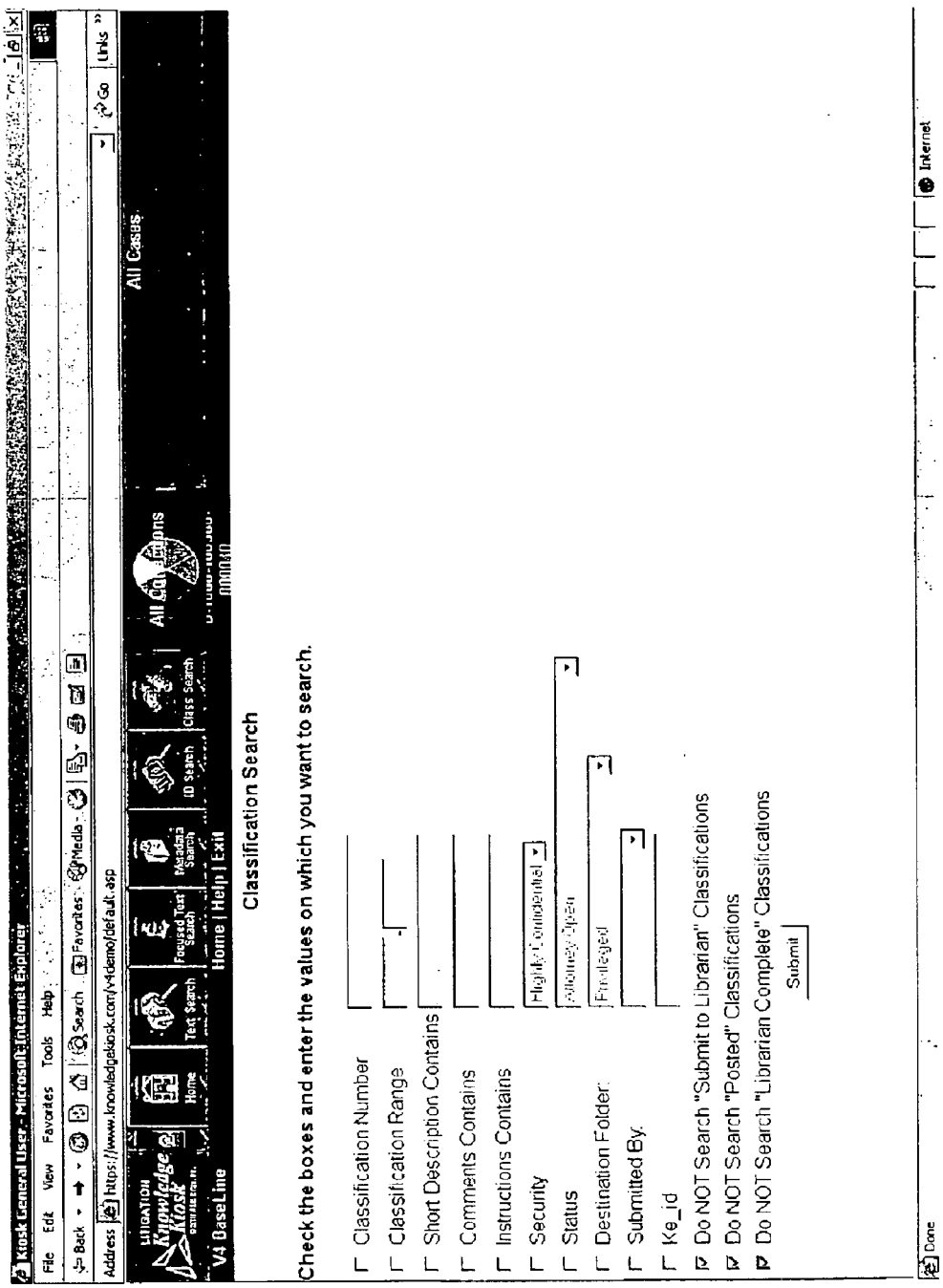
Figure 14:
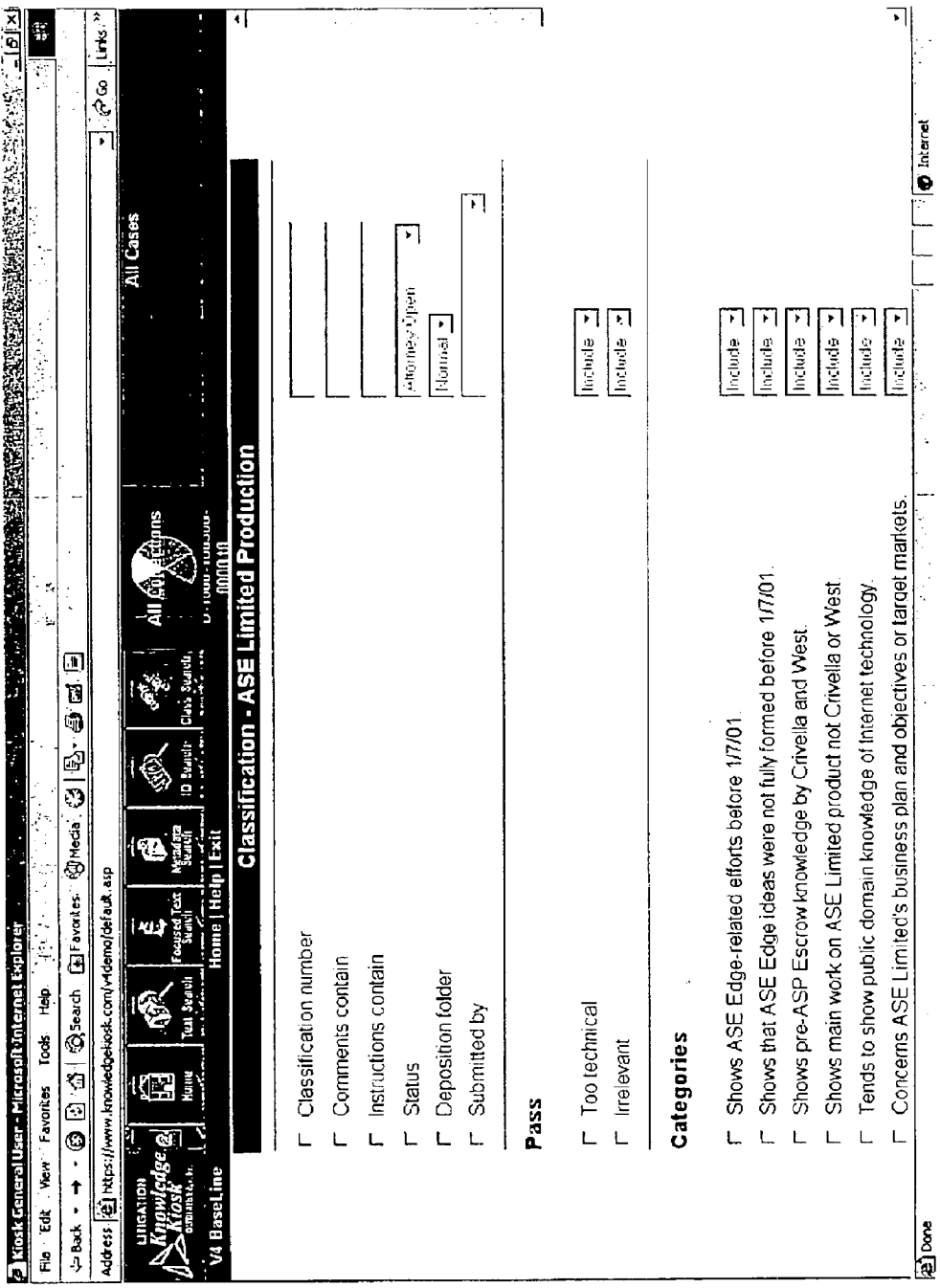
Figure 15A:
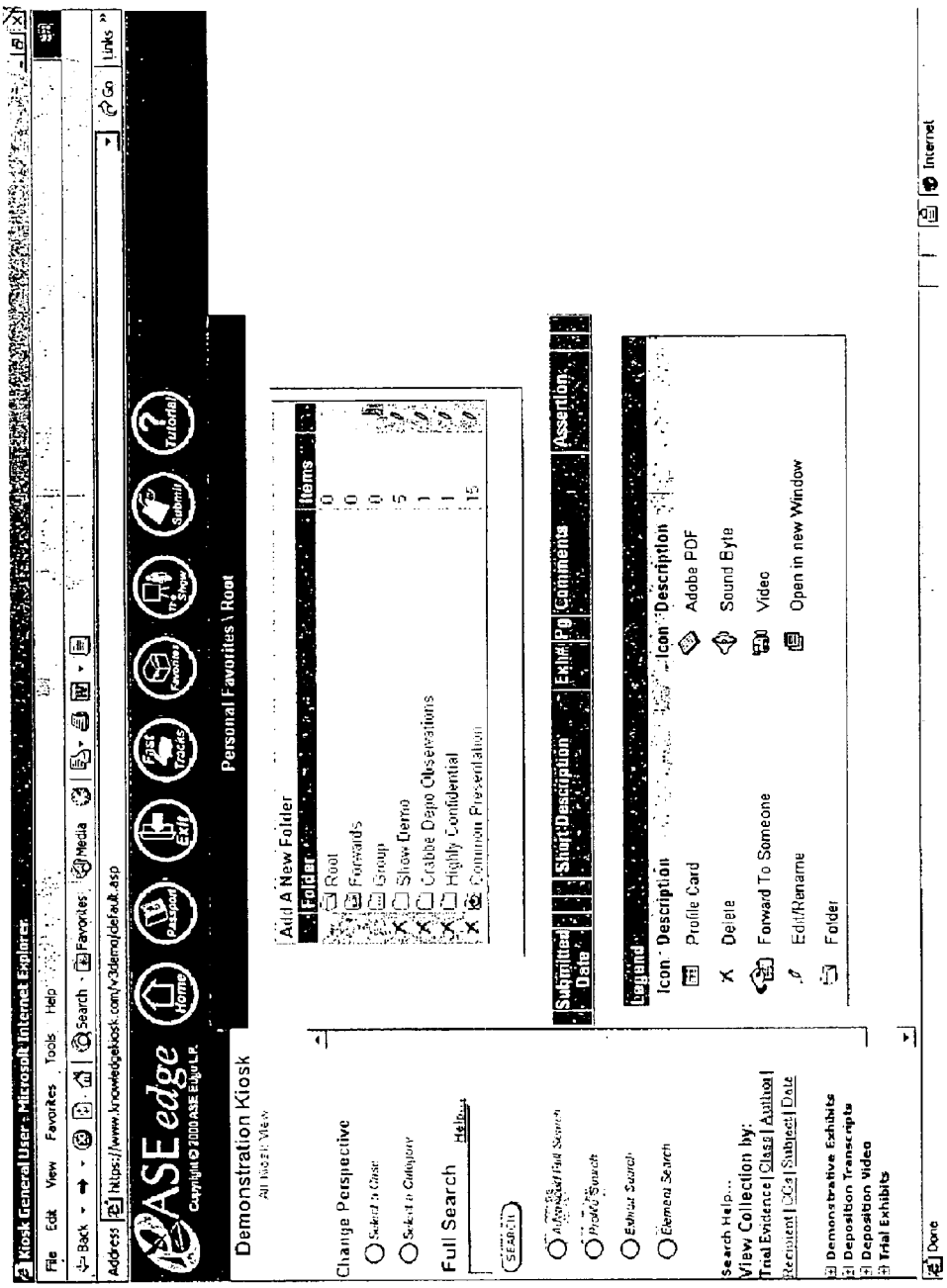
Figure 15B:
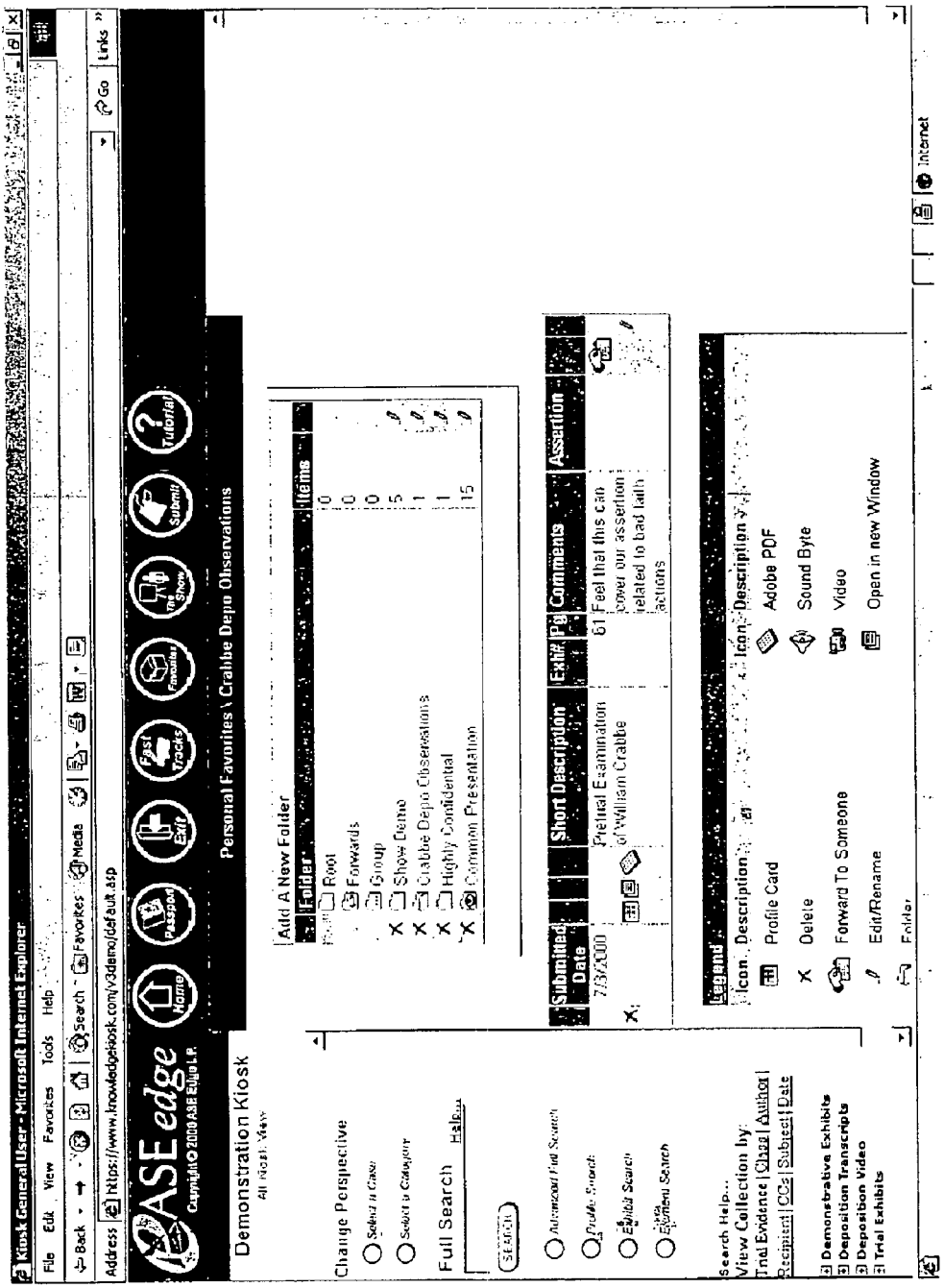
Figure 15C:
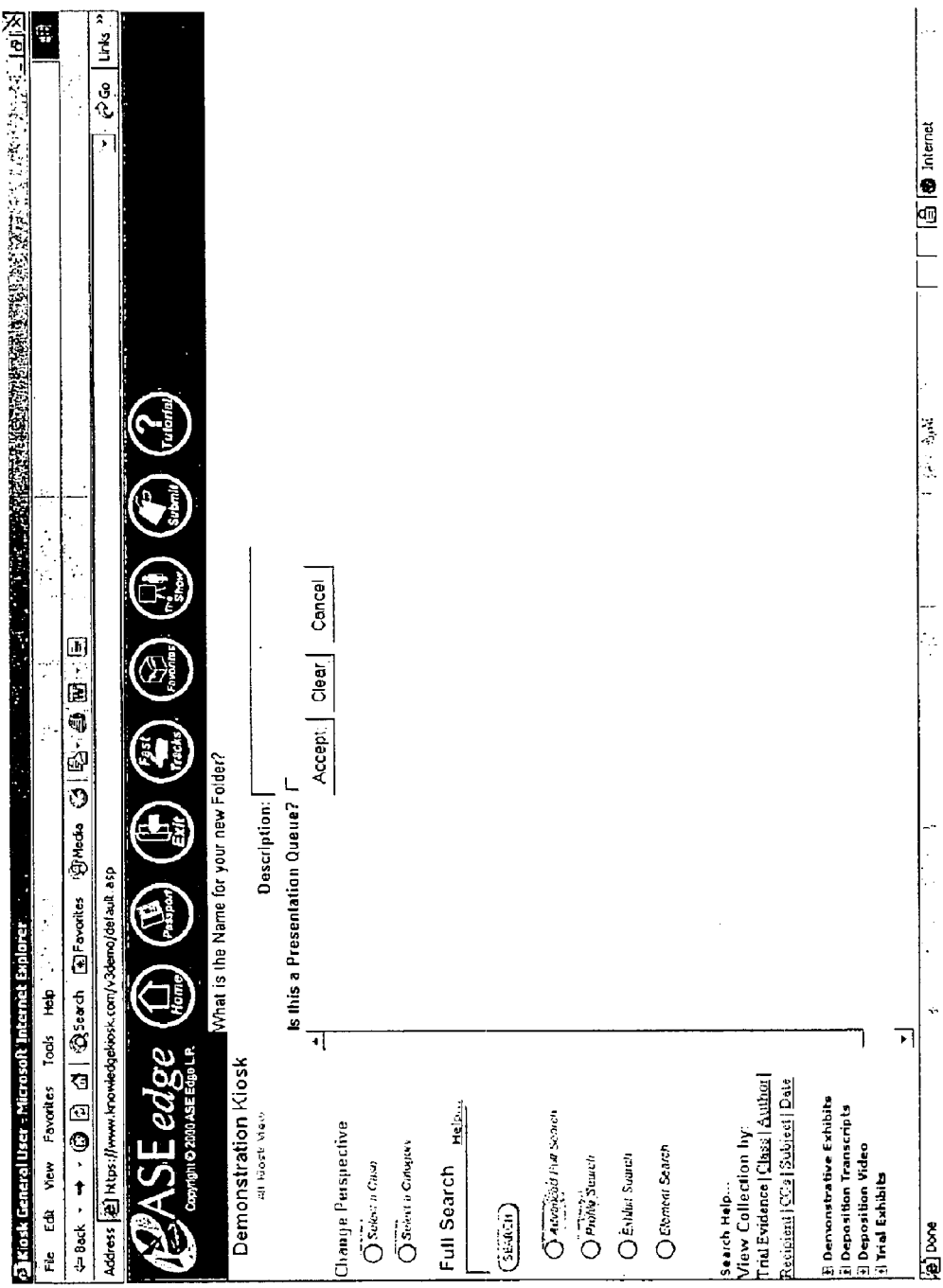
Figure 15D:
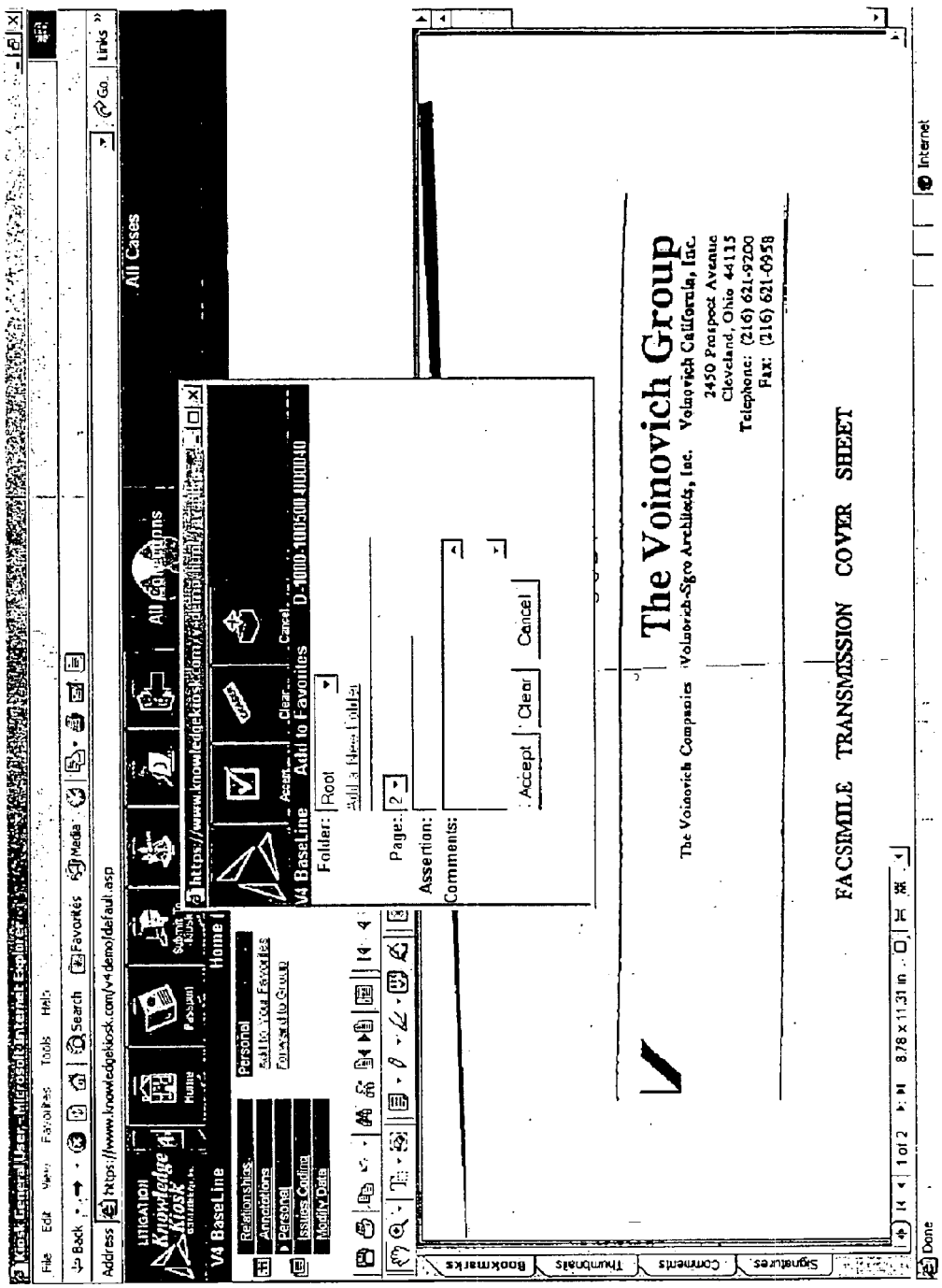
Figure 15E:
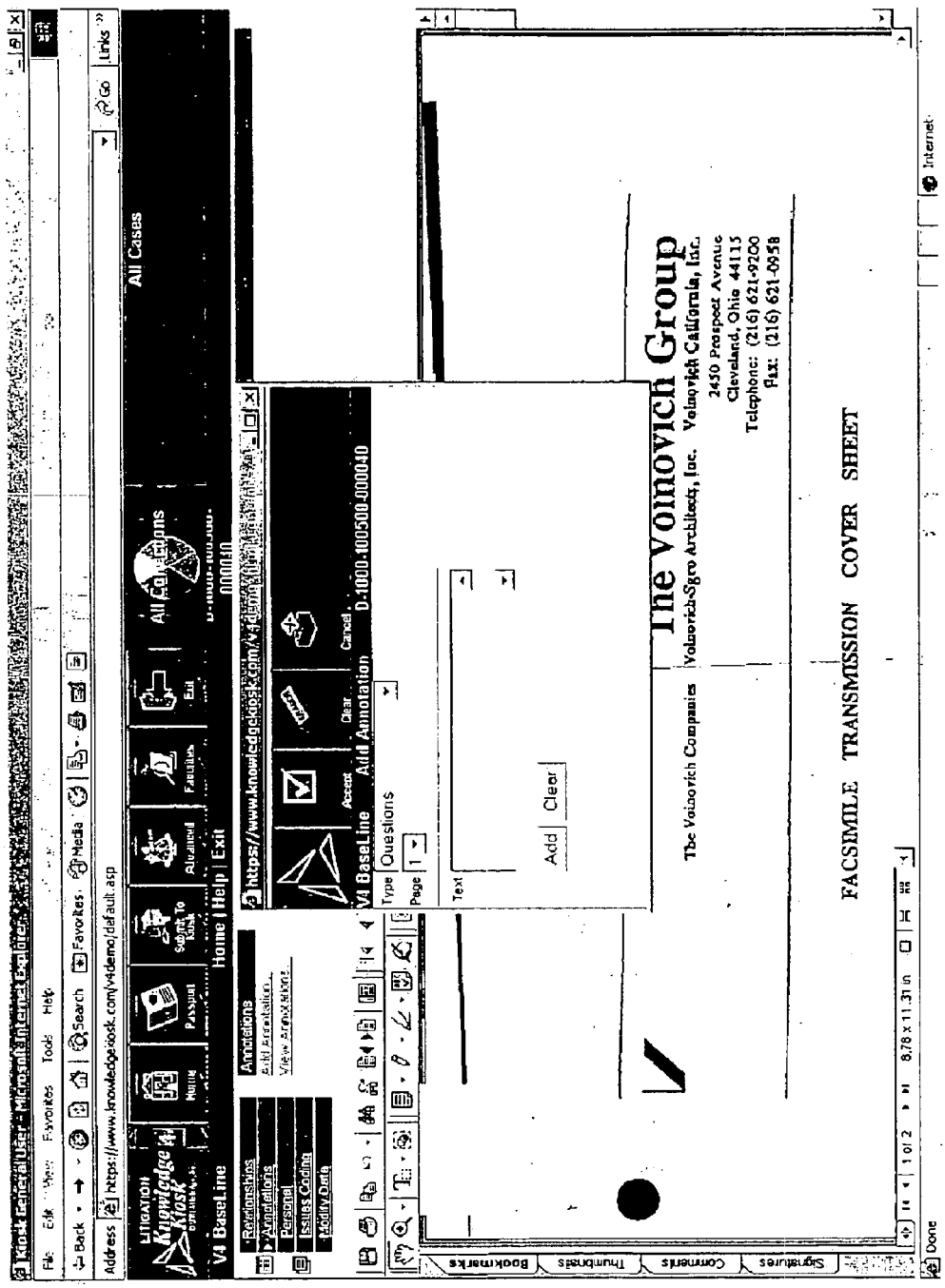
Figure 16:
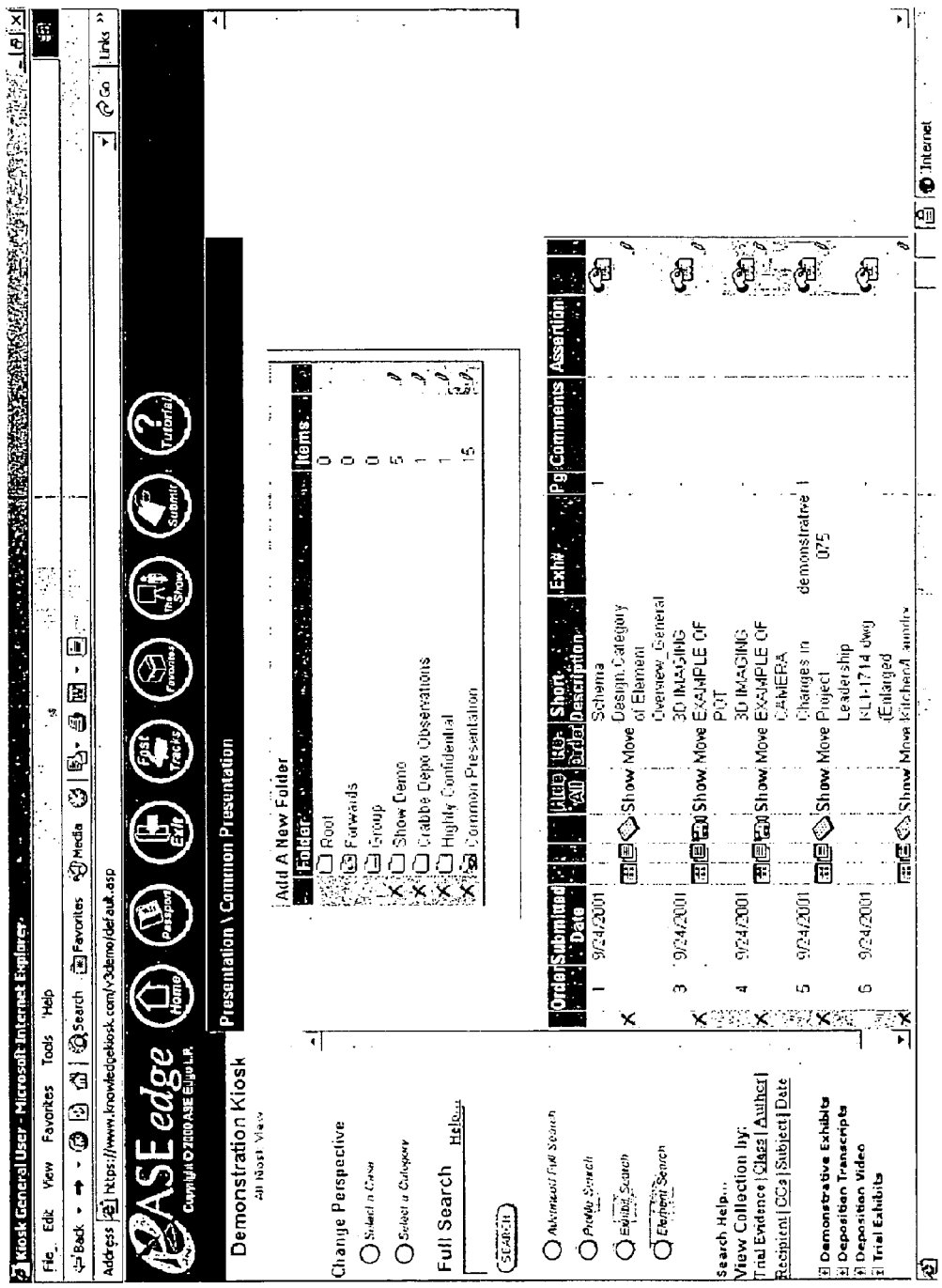
Figure 17A:
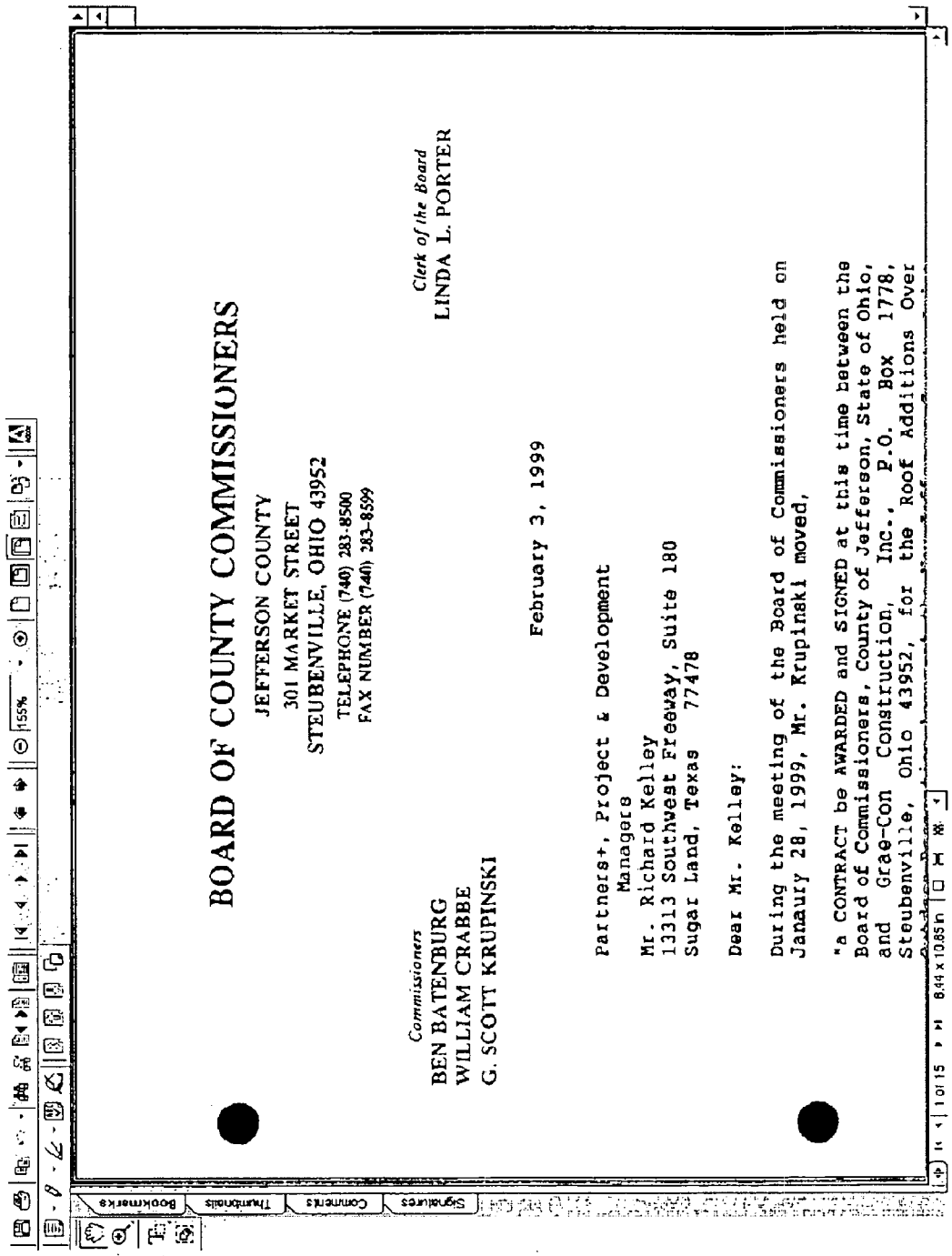
Figure 17B:
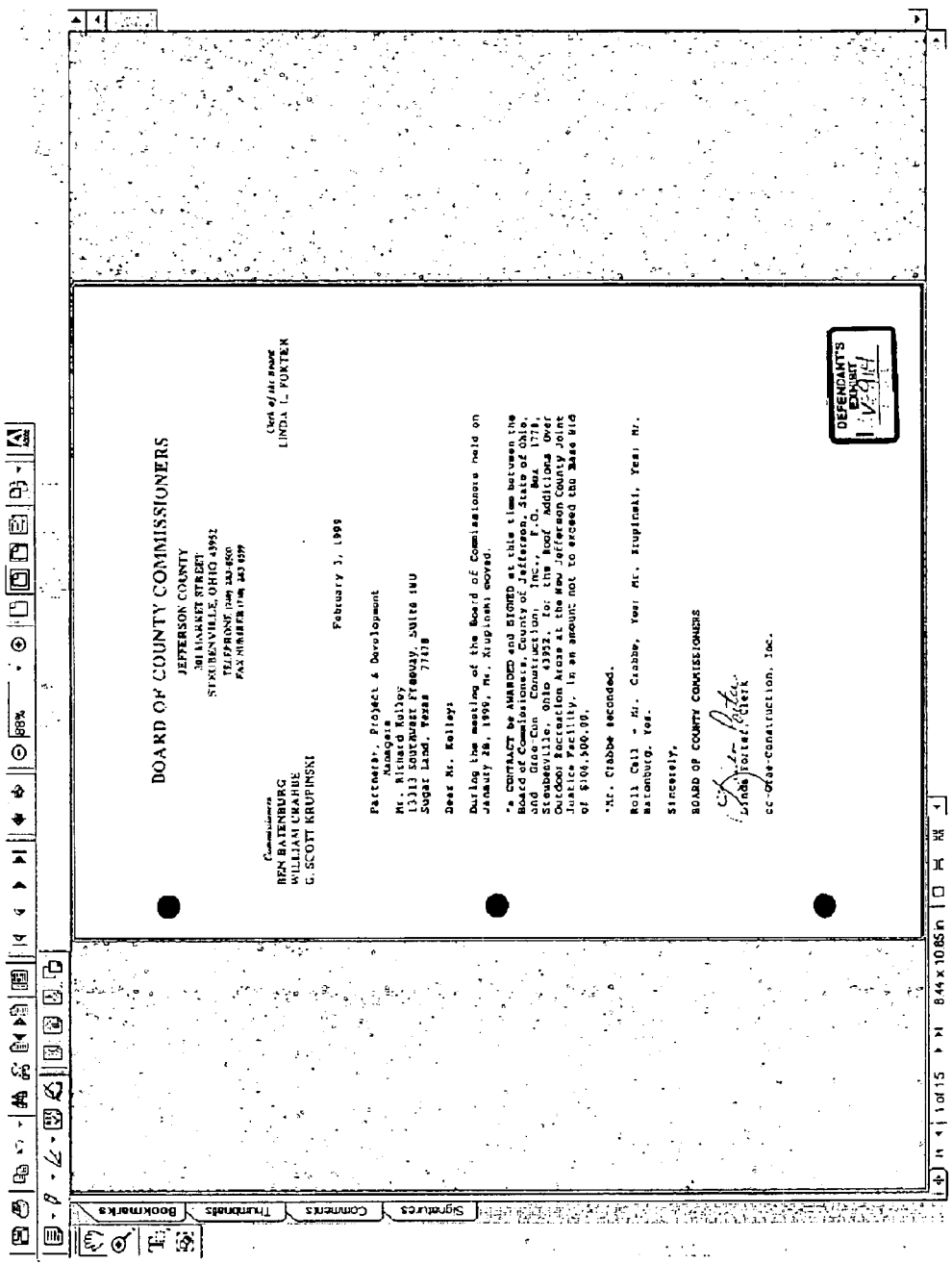
Figure 17C:
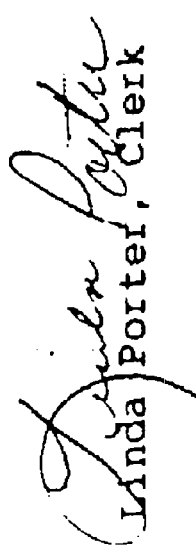
Figure 18A:
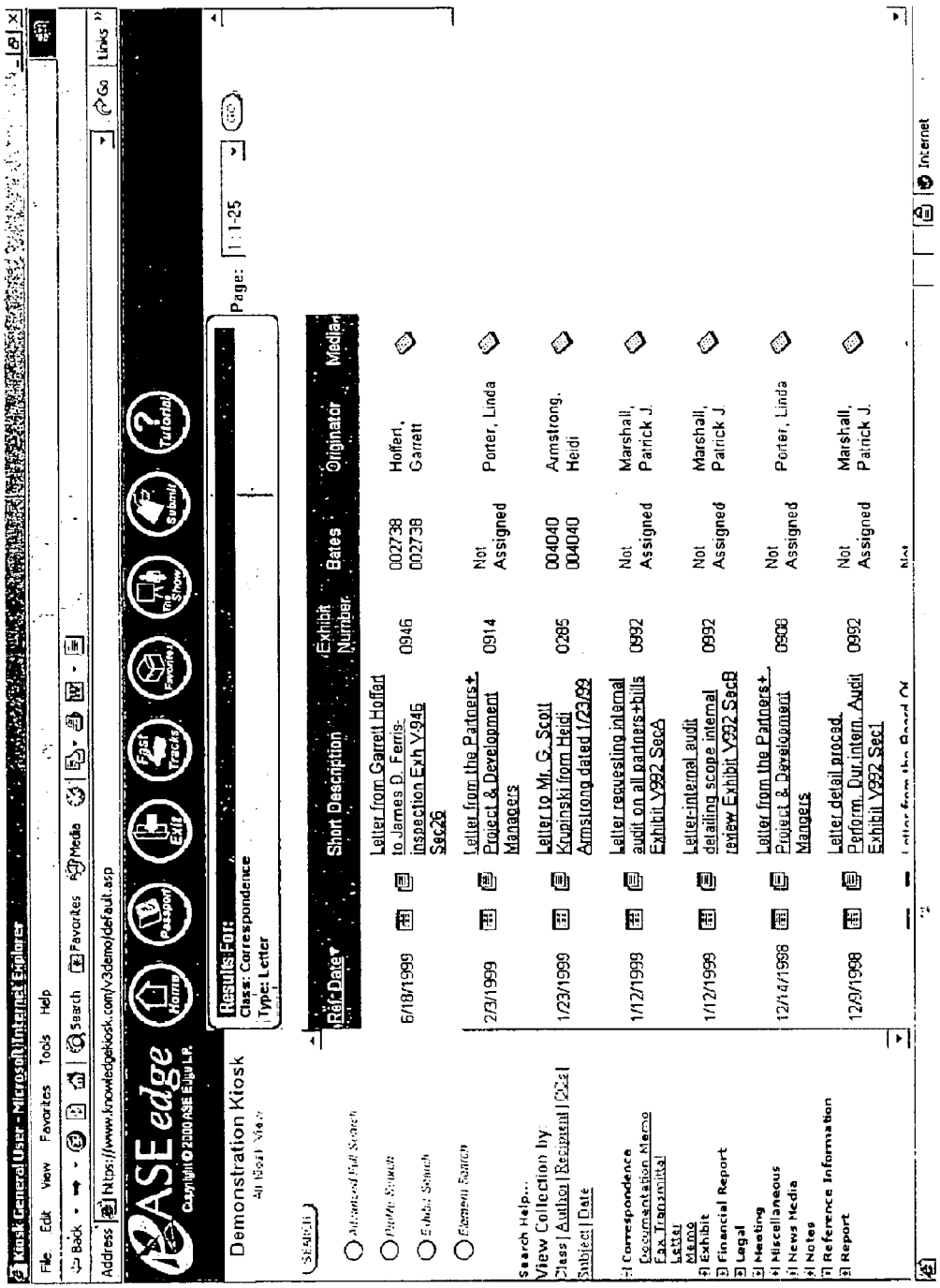
Figure 18B:
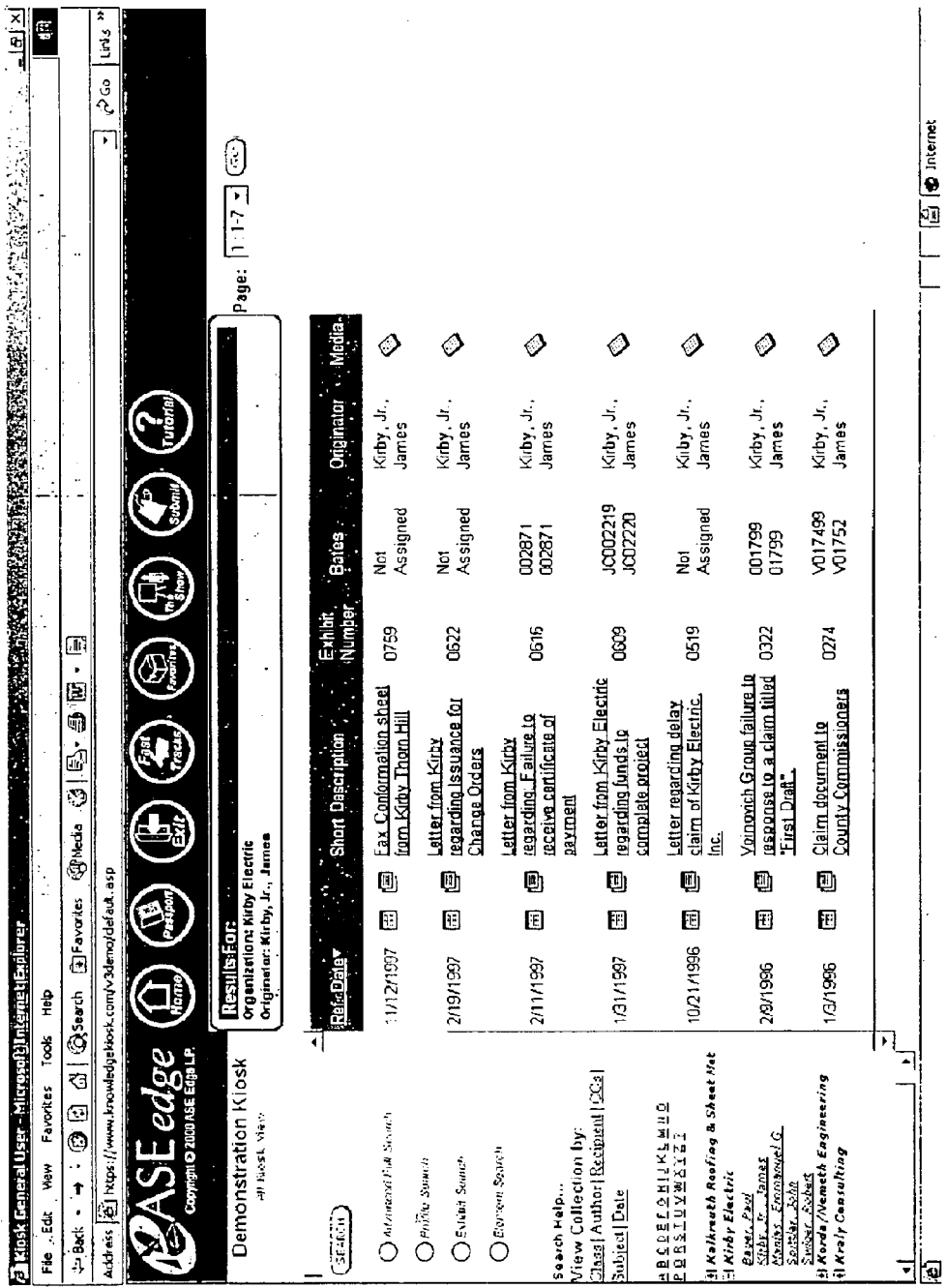
Figure 18C:
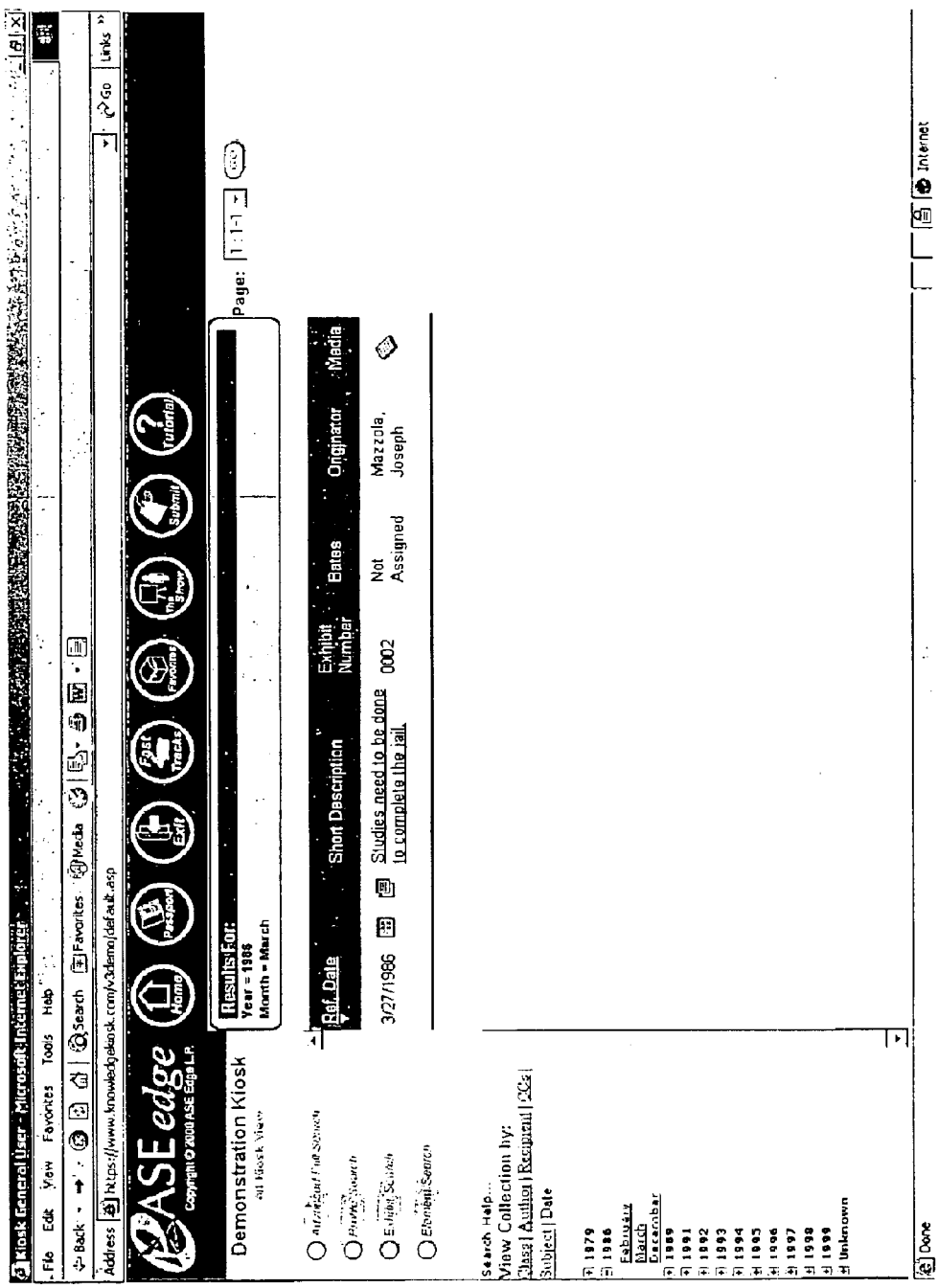

This pyramid shows unseen side of above

Figure 7

Figure 11B

Justice Facility, in an amount not to exc[eed] of $106,500.00.

"Mr. Crabbe seconded.

Roll Call - Mr. Crabbe, Yes; Mr. Krup[] Batenburg, Yes.

Sincerely,

BOARD OF COUNTY COMMISSIONERS

Linda Porter, Clerk cc-Grae-Construction, Inc.

Figure 18D

SYSTEM FOR UTILIZING AUDIBLE, VISUAL AND TEXTUAL DATA WITH ALTERNATIVE COMBINABLE MULTIMEDIA FORMS OF PRESENTING INFORMATION FOR REAL-TIME INTERACTIVE USE BY MULTIPLE USERS IN DIFFERENT REMOTE ENVIRONMENTS

FIELD OF THE INVENTION

This invention relates to a system for utilizing audible, visual and textual data with multimedia forms of presenting information for real-time interactive use by multiple users in different remote environments. Specifically, the invention relates to a system for receiving, accessing, processing, storing, retrieving, transmitting and utilizing audible, visual and textual data that provides real-time interactive knowledge management over the Internet in support of activities conducted simultaneously by multiple users in different remote locations utilizing alternative combinable multimedia digital data forms of presenting the information to simplify and maximize human understanding.

BACKGROUND OF THE INVENTION

The concept of the present invention has its genesis in solving the problem of "knowledge churn". It provides a new information management system capable of containing process knowledge and of utilizing this contained knowledge to manage common business, litigation and other activities in new ways.

Until the advent of computers, the traditional method of creating and maintaining knowledge was to store it in paper-based documents. A fundamental problem with this method is that the paper-based documents containing the stored knowledge are often archived in an inconvenient manner without an easy means of accessing and manipulating the stored data to allow its modification or re-use in a different context. This often leads to non-use and aging of the stored information to an extent that the obsolescence of the information serves as a disincentive to its modification or re-use at a later time or in a different context. This disincentive leads to a habit on the part of many individuals to commit the stored information to memory instead of referring to the storage source when re-use is necessary. This in turn leads to inefficiencies in the conduct of activity within an organization because of the informality of permitting critical knowledge to reside entirely or at least partially within the minds of individuals instead of storing this information in a mutable, physical way that will allow its easy manipulation and re-use in different contexts.

This informal mental retention of critical information leads to a problem known as "knowledge churn", wherein the quality, depth and usefulness of the organizational knowledge that resides within the mind of an individual is compromised when that individual leaves the organization or is no longer responsible for performing the set of responsibilities to which the knowledge relates. This requires a new individual to "re-learn" a lot of the information that had already been internalized and used efficiently by the previously responsible organization member, leading to inefficiencies in organizational operations. For example, in the manufacture of a product, a value is attached to the product that takes into account the labor necessary to produce the product. If the individuals responsible for making the product leave the organization, a lot of the skills, knowledge and experience that are uniquely necessary to produce that product depart with them, leading to a "knowledge churn" which results in the expenditure of a higher level of resources than previously needed to produce the product, due to the need to train new individuals who do not yet possess the skills, knowledge and experience of those individuals who departed.

With the advent of computers, the problem of "knowledge churn" is capable of being solved in unique ways due to the power of the computer to receive, access, process, store and transmit digital information so that it can be manipulated and re-used in different contexts. From the advent of word processing programs to the increasing power of personal computers and the development of software enabling communication in alternative mediums, forms and formats, the problem of "knowledge churn" can be solved in the sense of being able to represent complex issues and concepts ways that people can easily understand based on their common experience of comprehending information in many different forms either alone or in combination with each other at different times or at once. For example, textual-based content is capable of communicating information only in a basic written form, whereas a graphic presentation is capable of presenting communicating information in a richer visual environment. And just as "a picture is worth a thousand words", an audiovisual-based presentation of sequentially presented audible and visual images is "worth a thousand pictures" in its ability to convey a story to the user of the information. When these different forms of presenting information are combined with each other in various ways, complex issues become much easier to reduce to a more basic level of understanding. For example, a person can never actually experience the sensation of confronting a dinosaur, but the computer-aided graphic and audiovisual images used in the motion picture "Jurassic Park" permit the viewer to experience a fully rendered, computer-based simulation of the reality of being in physical proximity to a dinosaur that conjures up the assumed fear of being in such a situation in the human mind.

Thus, the advent of digital computer processing has permitted the presentation of information in different mediums, forms and formats to enable the representation of complex concepts in ways that truly enhance an understanding of the issue. When this technology is combined with transmission of the computer-based data over the Internet, more fundamental ways of communicating are possible, due to the possibility for interactive, multidirectional multimedia communications originated from anywhere in the world and made instantaneously available anywhere in the world to or from any number of different locations in the world simultaneously, if desired. This permits not only the mutable storage of critical information in a way that it can be easily manipulated for re-use, but also a multimedia digital representation of that information that permits an ease of understanding and a reality of experience that can be deployed over the Internet, not just in a broadcasting sense, but in an interactive, multidirectional sense so that different users can experience the information real-time, at the same time from anywhere in the world.

The present invention transforms this basic concept into an engineered system for managing the information known as a "Knowledge Kiosk"™, which is intended to represent the idea of a central repository of information where individuals come to convey and exchange knowledge. The present invention has initially been applied to the management of the litigation process, used by attorneys to manage information acquisition, exchange and workflow, but it also has application to management of virtually any other type of information in any other type of endeavor or business. In the litigation context, it permits all of the activity relating to the litigation of complex legal issues to be efficiently managed, being particularly suited to permitting major litigation or other business activity involving years and hundreds or thousands of hours of effort to be handled with a minimum of manpower. It accomplishes this purpose by eliminating the "knowledge churn" inherent in the involvement of multiple individuals in the process, through creation of a system which takes advantage of concepts utilized in linguistics and library science for uniform categorization of the various types information involved, combining this method of organization with computer software and internet technology to allow the receipt, access, processing, storage, retrieval, transmission and utilization of audible, visual and textual data for real-time interactive use by multiple users in different remote environments, and utilizing alternative combinable multimedia digital data forms of presenting the information to simplify and maximize human understanding.

Accordingly, it is an object of the present invention to provide the presentation of information in different multimedia digital forms and formats to enable the representation of complex concepts in ways that enhance human understanding.

It is another object of the present invention to provide technology that is combined with transmission of the computer-based data over the Internet to permit interactive, multidirectional multimedia digital data communications originated from anywhere in the world and made instantaneously available anywhere in the world to or from any number of different locations simultaneously, if desired.

It is another object of the present invention to provide technology that permits not only the mutable storage of critical information in a way that it can be easily manipulated for re-use, but also a multimedia digital representation of that information that permits an ease of understanding and a reality of experience that can be deployed over the Internet, not just in a broadcasting sense, but in an interactive, multidirectional sense so that different users can experience the information real-time, at the same time from anywhere in the world.

It is another object of the present invention to provide an engineered system for managing information known as a "Knowledge Kiosk"™ intended to represent the idea of a central repository of information where individuals come to convey and exchange knowledge.

It is another object of the present invention to provide a system used for management of any type of information involved in any type of endeavor or business, including litigation, by managing information acquisition, exchange and workflow to be handled with a minimum of manpower so as to eliminate the "knowledge churn" inherent in the involvement of multiple individuals in such processes.

It is another object of the present invention to provide a system which takes advantage of concepts utilized in linguistics and library science for uniform categorization of the various types information used in knowledge management.

It is another object of the present invention to provide a system which combines concepts for organizing information utilized in linguistics and library science with computer software and internet technology to allow the receipt, access, processing, storage, retrieval, transmission and utilization of audible, visual and textual data for real-time interactive use by multiple users in different remote environments, and utilizing alternative combinable multimedia digital data forms of presenting the information to simplify and maximize human understanding.

SUMMARY OF THE INVENTION

This invention relates to a system for utilizing audible, visual and textual data with multimedia forms of presenting information for real-time interactive use by multiple users in different remote environments. The system of the present invention is used for receiving, accessing, processing, storing, retrieving, transmitting and utilizing audible, visual and textual data that provides real-time interactive knowledge management, preferably over the Internet, in support of activities conducted simultaneously by multiple users in different remote locations utilizing alternative combinable multimedia digital data forms of presenting the information to simplify and maximize human understanding.

Concepts utilized in library science are implemented for uniform categorization of the information used in providing the knowledge management performed by the system, while concepts utilized in the science of linguistics are implemented for defining information acquisition, exchange and workflow to permit categorization of the managed information using the library science concept. The managed information is stored in a database according to a unique schema which implements this categorization according to the needs of the user. Computer technology is combined with the science of media production for presentation of the managed information in various multimedia audible, visual and textual digital forms and formats, to enable its representation in ways that enhance human understanding, while computer software application programming is provided to make the system work over a computer network, preferably the Internet, to permit interactive, multidirectional, multimedia digital data communications originated from anywhere in the world and made instantaneously available anywhere in the world to or from any number of different locations simultaneously, if desired.

The database schema provides multiple levels of restricted access to the managed information in a way that allows the information to be included within categories each having subcategories that together implement the database schema. The information in each category or subcategory is retrievable independent of the information in any other category or subcategory, and information containing a common characteristic is retrievable from different categories or subcategories. The database schema is structured to allow a single item of managed information to be stored in at least two different locations when that information has been altered from its original form, and a single item of managed information can be referred to by more than one designation in a way that permits each designation to reference other designations for that item.

The user accesses the managed information from an internet web page having access through a web server to the database. The web page contains a feature for providing access to the most common or most recent information used within a category or subcategory, and contains features enabling retrieval and processing of the managed information for presentation in each form in which the information is used. The web page also contains a feature for storing the information most commonly used by a given user according to a categorization established by that user, The system contains features for selection of an audible, visual and/or textual broadcast of designated managed information according to a selected multimedia format, in such manner that the designated item is combinable with other items of managed information for presentation in a single broadcast, or such that the broadcast item(s) are presented in a combination of audible, visual and/or textual multimedia forms.

The system also contains features for searching each category or subcategory for a designated item of managed information, such that the search can be conducted by a match of data, identification information or classification information for that item. Finally, the search can be conducted in a manner that accommodates inaccuracies created by the search request and/or digitization of the searched item.

These and other advantages of the invention will become apparent from a perusal of the following detailed description of the presently preferred embodiments of the invention taken in connection with the accompanying drawings.

BRIEF DESCRIPTION OF THE DETAILED DRAWINGS

FIG. (1) shows a "Knowledge Pyramid" used to represent the four basic aspects of the system of the present invention as they are combined together to permit receiving, accessing, processing, storing, transmitting and utilizing audible, visual and textual data for real-time interactive use by multiple users in different remote environments utilizing alternative combinable multimedia forms of presenting the information to simplify and maximize human understanding.

FIG. (2) shows the home page of a preferred embodiment of the system of the present invention as implemented on the Internet Web Site at "www.knowledge kiosk.com".

FIG. (3) shows the "Passport" page of a preferred embodiment of the system of the present invention as implemented on the Internet Web Site at "www.knowledge kiosk.com", which serves as the launching point for accessing the various Knowledge Kiosks containing the data being managed by the system.

FIG. (4) shows the "Fast Tracks" page for the selected Knowledge Kiosk which provides access to the most commonly-used information in that particular Knowledge Kiosk.

FIG. (5) shows an example database schema for implementing the present invention in a litigation support context entitled "Categories of a Litigation Knowledge Kiosk Elements—Overview".

FIG. (6) shows an example database schema for implementing the present invention in a multi-tier litigation support context entitled "Overall Organization—Multi-Tier Litigation Knowledge Kiosk".

FIG. (7) shows an example of a submission form completed by the user for storage of an item of information within a selected Knowledge Kiosk.

FIGS. (8A) through (8F) show examples of the various searches that can be conducted for retrieving a Knowledge Element from a particular Knowledge Kiosk FIG. (9) shows an example of a "Knowledge Element Classification Profile" containing fields providing information describing and classifying the Knowledge Element.

FIGS. (10A) through (10D) show an example of an advanced search designed to retrieve a multimedia rendering of a particular Knowledge Element.

FIGS. (11A) through (11D) show an example of an advanced boolean search conducted to locate a particular data string within any Knowledge Element in the Knowledge Kiosk of interest.

FIGS. (12A) through (12E) show an example of a classification conducted on a document that has already been entered as a Knowledge Element within a selected Knowledge Kiosk.

FIGS. (13A), (13B) and (14) show an example of searches that can be conducted on the classifications created by the user with the options shown for example in FIGS. (12A) through (12E).

FIGS. (15A) through (15E) show an example of a user-defined "Favorites" page.

FIG. (16) shows an example of a user-defined "Presentation Queue" folder.

FIGS. (17A) through (17C) show an example of the "Knowledge Element Viewer".

FIGS. (18A) through (18D) show examples of the results of various searches conducted on different types of information contained within the "Knowledge Element Profile".

Figure 19A:
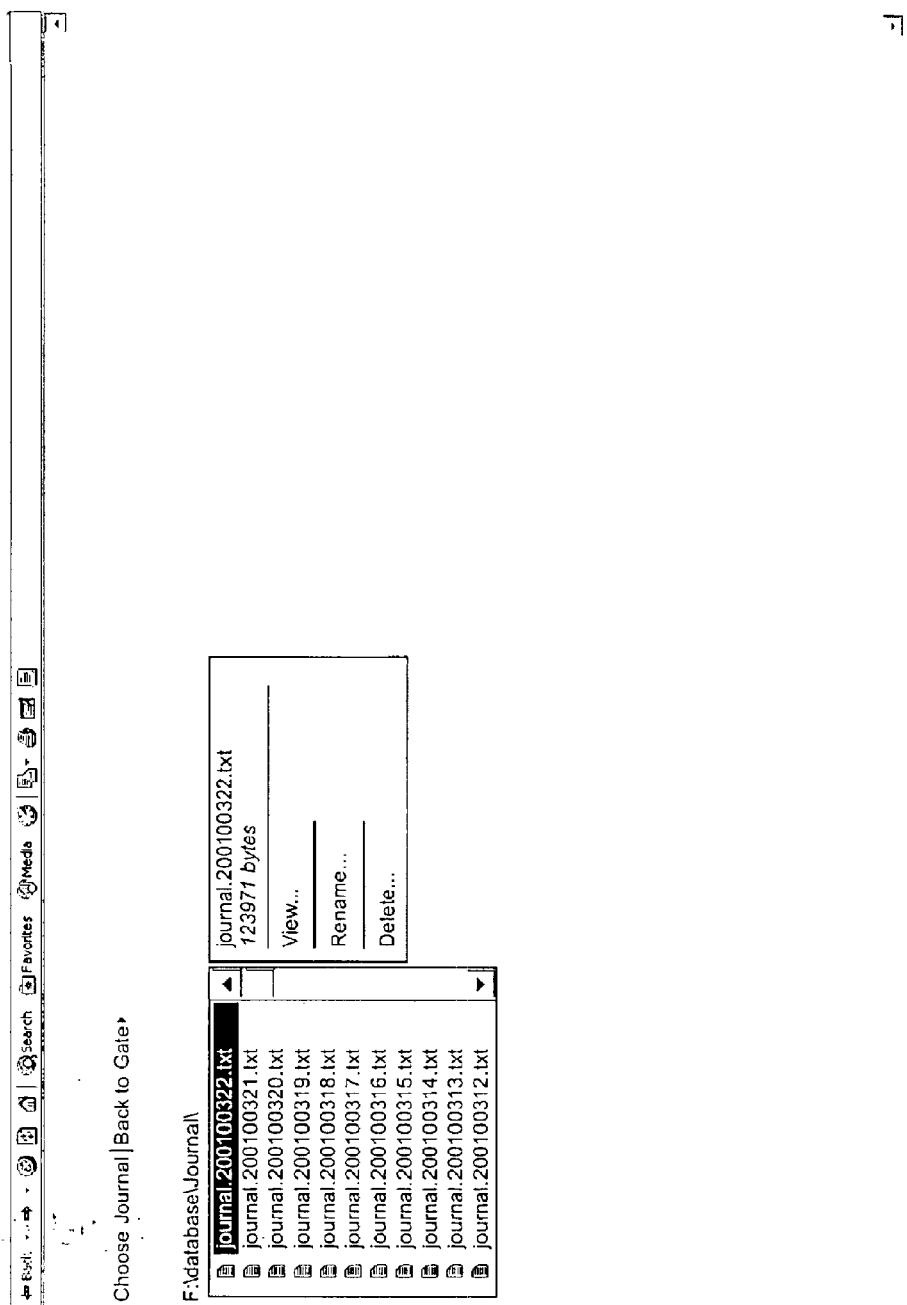
Figure 19B:
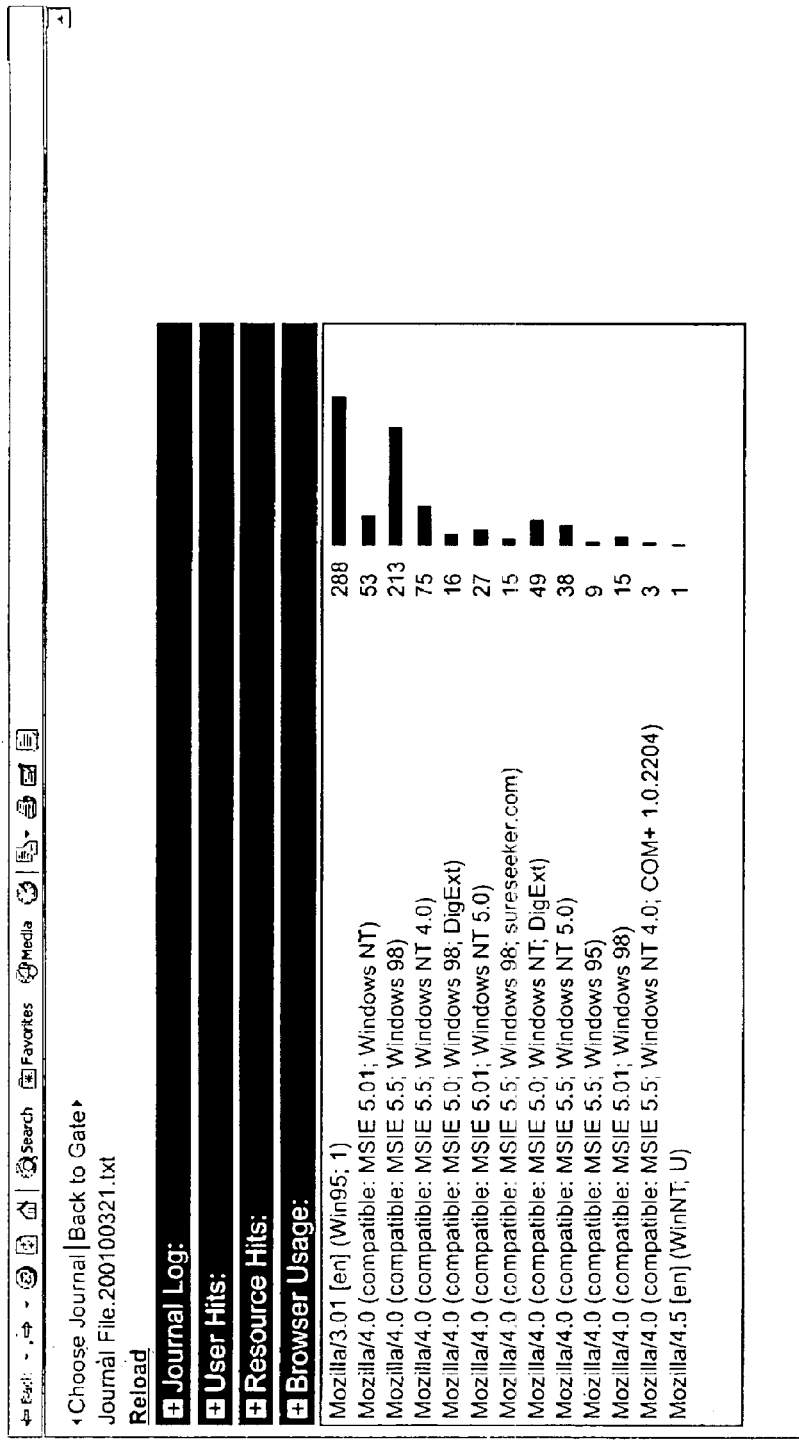
Figure 19C:
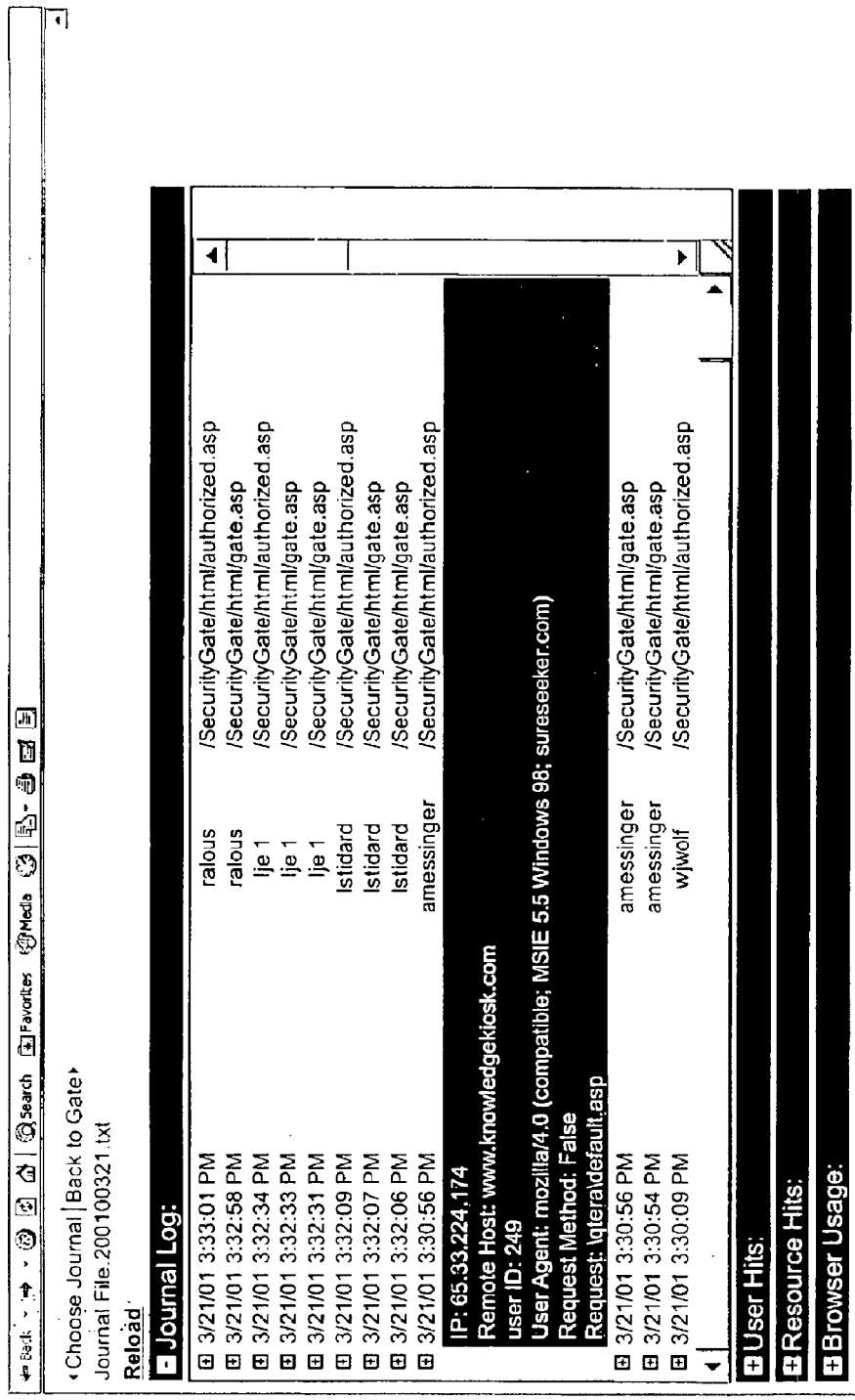
Figure 20:
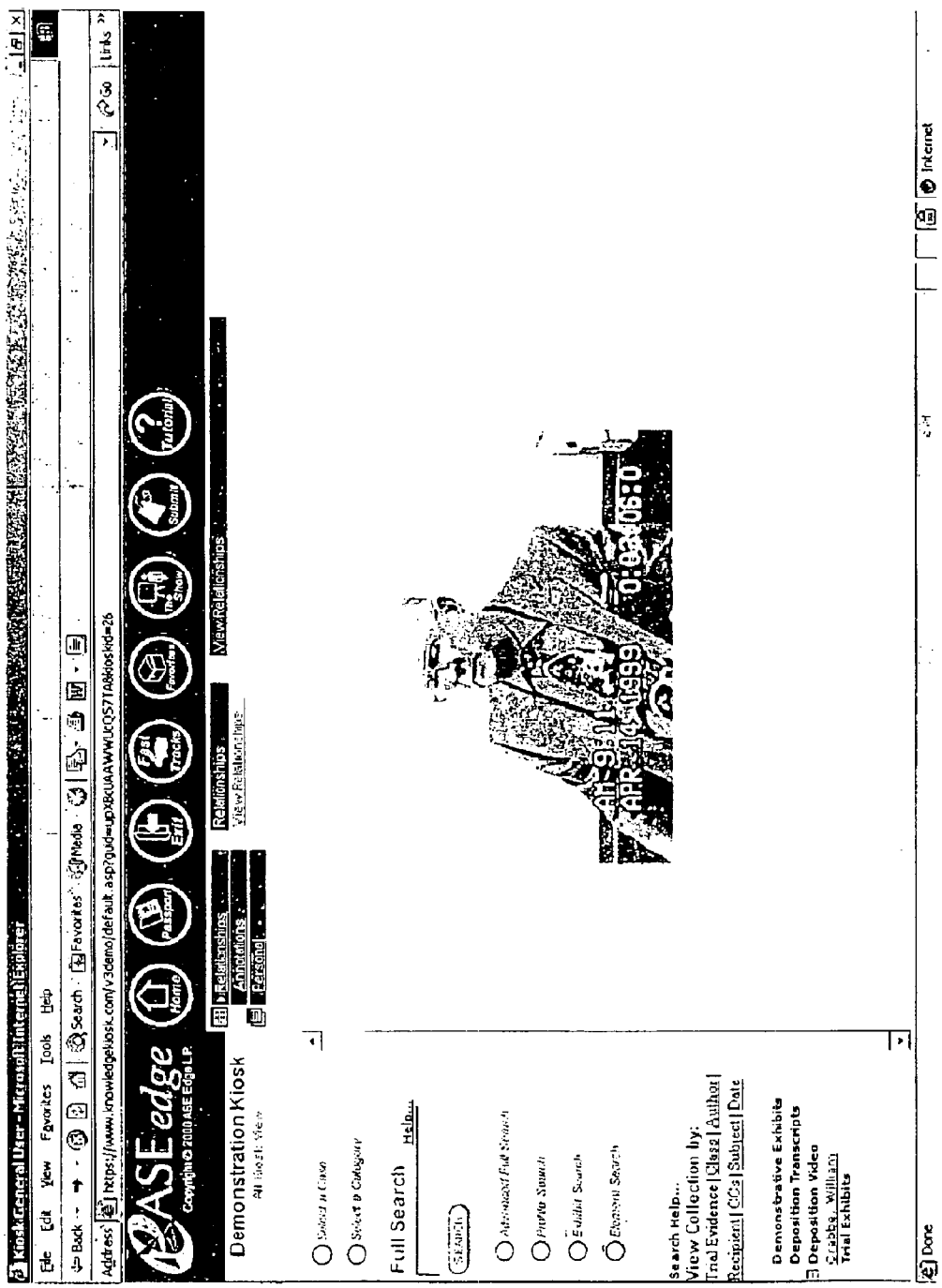
Figure 21:
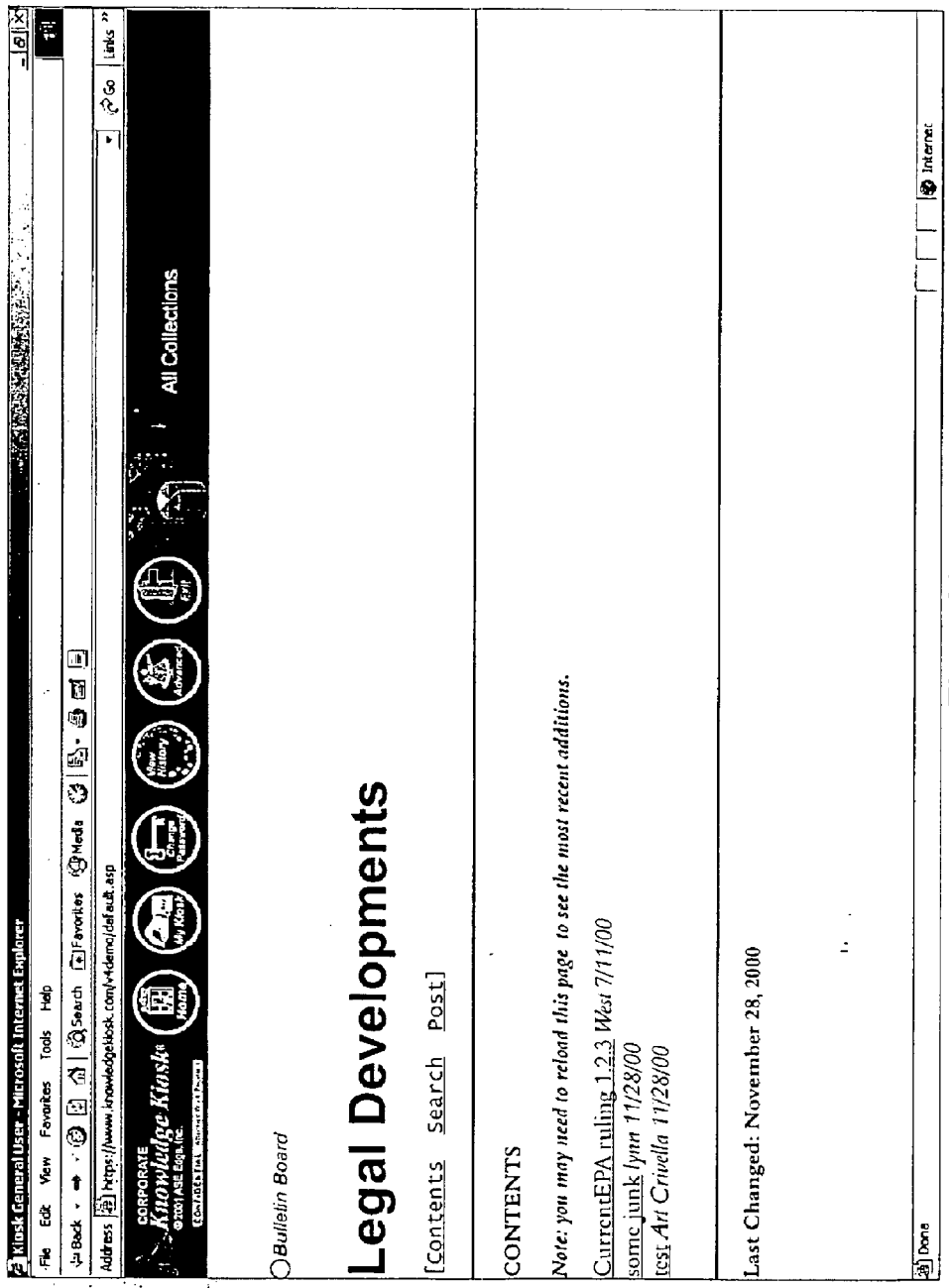

FIGS. 19(A) through (19C) show examples of the information contained in a "Knowledge Kiosk Journal" which provides different ways of tracking all user activity with respect to a given Knowledge Kiosk.

FIG. (20) shows a multimedia rendering of a particular Knowledge Element.

FIG. (21) shows an example of a "Bulletin Board" page for conducting multi-user interactive activities using the Knowledge Kiosk.

DETAILED DESCRIPTION OF THE PRESENTLY PREFERRED EMBODIMENTS

FIG. (1) shows the different views of a two-dimensional depiction of a three-dimensional "Knowledge Pyramid" 10 that represents four of the basic aspects of the system of the present invention. One side of the "Knowledge Pyramid" represents the "Research and Reference Library" 11 which takes advantage of concepts utilized in library science for uniform categorization of the various types information used in the knowledge management performed by the system. This approach is designed to eliminate the redundancies normally associated with retrieval of data over the Internet. Another side of the "Knowledge Pyramid" represents the "Work Process Application" 12 which uses the science of linguistics in defining information acquisition, exchange and workflow to permit categorization of the managed information using the library science concept. Combined, the application of library science and linguistics concepts allows use of the system to manage information in virtually any type of endeavor or business, including the litigation process for which the preferred embodiment of the present invention is adapted. Another side of the "Knowledge Pyramid" is "Internet Multimedia Communications" 13 which combines computer technology with the science of media production for presentation of the managed information in various multimedia audible, visual and textual digital forms and formats, to enable its presentation in ways that enhance human understanding. Finally, the remaining side of the "Knowledge Pyramid" is "Work Management" 14 which combines the multimedia aspect of the invention with the computer software application and database programming necessary to make the system work over the Internet to permit interactive, multidirectional multimedia digital data communications originated from anywhere in the world and made instantaneously available anywhere in the world to or from any number of different locations simultaneously, if desired. When used together, these four sides of the "Knowledge Pyramid" of FIG. 1 represent the combination of features that enable the system of the present invention to permit receiving, accessing, processing, storing, transmitting and utilizing audible visual and textual data for real-time interactive use by multiple users in different remote environments, utilizing alternative combinable multimedia forms of presenting the information to simply and maximize human understanding. The data managed by use of the various aspects of the "Knowledge Pyramid" comprises a Knowledge Kiosk which serves as a repository for all of the information needed to accomplish a particular activity or carry out a particular process (such as running a business operation or engaging in litigation). The Knowledge Kiosk serves as the "back end" database of information that is being managed by the system in connection with the particular activity to which the information relates, and the "front end" website applications used with the system allow the processing of this data for access by remote users over the Internet in the multimedia form(s) in which he information is desired to be used.

System Architecture

These aspects of the invention will be discussed in conjunction with a preferred embodiment of the system presently implemented on the Internet at the Web Site "www.knowledge kiosk.com" which has a home page shown at FIG. (2). The known technology for establishing the website as well as receiving, accessing, processing, storing, retrieving, transmitting and utilizing the data made available to, from and on the website is common to conventional website design and use, and is implemented using standard website design tools and operating software such as for example Microsoft.NET, Microsoft VisualBasic, Microsoft Visual C++, Microsoft InterDev, Microsoft FrontPage, Adobe SDK, DT Search SDK, Macromedia Flash5 and Autodesk 3D StudioMax. As shown in FIG. (2), the website can be remotely accessed from anywhere in the world with a password and a user name (with optional second level authentication such as random number verification) using commercially available hardware such as a wired or wireless personal or handheld computer configured with a standard web browser such as Netscape Navigator or Microsoft Internet Explorer (utilizing standard plug-ins such as Adobe Acrobat Reader for pictorial and graphics presentations and RealPlayer (produced by RealNetworks, Inc.) for multimedia presentations) and having Internet access through an internet service provider or a computer network web server. Upon user authentication, the system software is accessed over the website to determine the user computer Internet Protocol (IP) address (which can be the user's normal local address or a remote address) to and from which further communications with the system will be directed, along with the time and date of the last communication made to or from the user and the history of that particular user's prior usage. Upon authentication, a secure sockets link (or SSL data communications link denoted by the designation "HTTPS") is set up with the user's IP address using standard one hundred and twenty-eight (128) bit data communications encryption (although other standard encryption methods could be used).

The system provides a "back end" database for storing the information comprising the various Knowledge Kiosk repositories being managed by the system in connection with the particular activity for which the system is being used. The database Knowledge Kiosks are accessed by the user with the "front end" website application software. The database schema implements the library science approach for uniform categorization of the various types information used in the knowledge management performed by the system. The database can be implemented by any standard internet (or web) accessible database that is structured query language (SQL) compliant such as Microsoft SQL Server, Oracle 8I/9I, IBM DB2, Microsoft Access or FoxPro. The particular database schema design is developed based on the client's needs, and represents how the "library" is organized to categorize the particular types of information managed by the client's Knowledge Kiosk. Searching of the database schema can be done by any standard search scheme such as natural language and Boolean operator searches.

An example database schema for implementing the present invention in a litigation support context entitled "Categories of a Litigation Knowledge Kiosk Elements—Overview" is shown in FIG. (5). The "pie-chart" organization of the schema represents the entire universe of information included in that particular Knowledge Kiosk. Upon receipt by the system, the digitized data (or Knowledge Element) to be included in the Knowledge Kiosk is categorized for storage in the "library" according to the database schema organizational concept developed for the client, and is retrieved from the "library" using the graphical user interface (GUI) navigation scheme provided by the website interface to access the data according to its stored category type(s). Each Knowledge Kiosk designed for a different application or use requires a different database schema "library" structure, which is dictated by the business processes and practices that are undertaken by the client in gathering and using the information contained in the Knowledge Kiosk. In FIG. (5) the database structure shown in the "pie chart" is a representation of a typical litigation process in which information is gathered through discovery and presented for trial. The blue section of the "pie chart" of FIG. (5) shows all of the materials in the case exchanged between the parties in response to discovery orders. The orange section of the "pie chart" of FIG. (5) shows all of the court papers that have been filed and/or exchanged between the parties in the case. The yellow section of the "pie chart" of FIG. (5) shows all of the materials that are produced by the attorneys or exchanged between the attorneys defined as attorney work product. The green section of the "pie chart" of FIG. (5) shows all of the materials that have been accepted for use at trial, such as deposition transcripts and demonstrative and trial exhibits.

Sections of the database schema "library" can be selected for various levels of restricted access such as attorney-client privileged information. For example, one level can permit access of certain items only to outside counsel of the opposing party and not to in-house counsel directly employed by the opposing party, while a second less restrictive level can permit access to all attorneys including in-house counsel but not other employees of the opposing party, while a third even less restrictive level can permit access by all parties to the litigation but not the public, while a final nonrestricted level can permit public access to the information accessible under that security level such as public documents that are filed with the court. Those individuals who are not permitted a certain level of access will not even be able to "view" the information in the restricted level so that it appears to such user that the information does not exist at all.

Each collection (or category) of data in the "library" database schema is broken down in terms of further subcollections where each smaller subcollection is "nested" within the larger collection(s) of which it is a subset. For example, a category encompassing all legal research can be further broken down in to that research dealing only with discovery information, which can in turn be further broken down into research dealing only with the discovery information produced by one of the parties to the case. This is done in order to prevent inadvertent production of nonapplicable information which is excluded from a particular subcategory but included within a larger category of which that subcategory is a part, and also for allowing quick and easy access to the most relevant information in response to a query for a particular item or type of information, thereby eliminating redundancies that lead to inefficiencies in retrieval of the desired information. This approach permits "cutting" the database schema "pie" in vertical "slices" to retrieve all items included in a particular category or subcategory of information, such as all attorney-client privileged information; a subcategory of which would include all attorney-client privileged information produced by the plaintiff; a subcategory of which would in turn include all attorney-client privileged information produced by the plaintiff on a particular legal issue. This approach also permits "cutting" the database schema "pie" by "layers" to retrieve information having a characteristic common to all (or less than all) categories and subcategories, such as all documents prepared by a particular opposing counsel whether or not attorney client privileged. The search scope can be still narrowed further by "cutting" the "pie" both by "slice" and "layer" to retrieve only those items included in a particular category or subcategory of information that have a sought characteristic, such as all attorney client privileged information prepared by a particular opposing counsel.

FIG. (6) shows an example database schema for implementing the present invention in a multi-tier litigation support context entitled "Overall Organization—Multi-Tier Litigation Knowledge Kiosk". The database schema in FIG. (6) is essentially a "layered cake" extension of the "pie chart" schema shown in FIG. (5) to accommodate multi-party, multi-district litigation where more parties than a single plaintiff and defendant are involved and/or the litigation is being conducted in more than one court and/or more than one lawsuit is involved. The same principles apply as described above with respect to FIG. (5) in terms of "cutting" the cake "vertically" to access all documents of a given category no matter what case they relate to; "cutting" the cake "horizontally" to access all documents from a given case no matter what category they relate to; or "cutting" the cake both "vertically" and "horizontally" to access only those documents included in a particular category that relate to a given case and/or also have a sought characteristic in common.

The same item of information may have been altered during the litigation process, requiring its inclusion or storage twice in the database in two different categories or subcategories even though it represents the same item. For example, a single document that has been presented by a party in discovery will require inclusion in the discovery document category, and will also require inclusion as a separate and distinct item in the deposition exhibit category if used in a deposition, and will require further inclusion as yet another separate and distinct item in a third category of altered deposition exhibits if interlineated with handwritten notes during the deposition. On the other hand, if the item of information has been referred to in different ways but has not been physically altered, the database can store it only once and subsequently refer to it by all of the different identifications which have been used for that item. For example with respect to the "cake layer" database of FIG. (6), the same document produced or deposition taken in two different cases of a multi-district litigation will require inclusion or storage only once in the database if it is has not been altered in either of the two cases, but a reference to each case will be required in identification of the document or deposition transcript so that it can be retrieved with respect to either case.

System Use

FIG. (3) shows an example of the "Passport" page which serves as the launching point for accessing the various Knowledge Kiosks containing the data being managed by the system. As shown in FIG. (3), the "Passport" page lists the names (i.e., "V3 Sample Litigation" and "V4 Litigation") of the particular Knowledge Kiosks to which the user has access (by recognition of username, password and security authentication). A particular Knowledge Kiosk can be selected in a standard manner such as by using a mouse to "click on" the portion of the screen containing the desired Knowledge Kiosk designation.

FIG. (4) shows an example of the "Fast Tracks" page for the Knowledge Kiosk selected from the "Passport" page, which is preferably automatically loaded once the Knowledge Kiosk is selected. The "Fast Tracks" page preferably provides access to the most commonly-used and/or newest information in that particular Knowledge Kiosk, such that the most essential information included in the Knowledge Kiosk is made universally available to all users of the system with "one click", no matter what their experience or skill level in using the system. The "Fast Tracks" page serves as the launching point for accessing (through standard drop-down menus and/or graphic "click on" icons) the executable software code files that lead to use of the different features of the system which allow retrieval of data from the selected Knowledge Kiosk and manipulation of that data for presentation in the various form(s) in which the data is desired to be used. Selection of the various options on the "Fast Tracks" page leads to different standing queries for accessing the Knowledge Kiosk database to provide the type(s) of information sought under that option. The "All Kiosk View" portion of the "Fast Tracks" page will lead to a view of the entire "library" of files containing the information in the selected Knowledge Kiosk. Selection of the "Home" or the "Fast Tracks" button leads back to the "Fast Tracks" page as shown for example in FIG. (4). Selection of the "Passport" button leads back to the "Passport" page as shown for example in FIG. (3). Selection of the "Favorites" button leads to a page as shown for example in FIG. (15) where various user-defined folders can be set up to permit organization of the information most commonly used by that particular user. Selection of the "The Show" button provides access to an Internet broadcast of selected materials located in the Knowledge Kiosk as shown for example in FIG. (16). Selection of the "Submit" button leads to submission of an item of information to the Knowledge Kiosk as shown for example in FIG. (7). Selection of the "New Kiosk Elements" leads to a listing of all files created in the Knowledge Kiosk database in the prior week or in the current week or on that particular date, as provided by the menu item selections, while selection "New Court Papers" and "New Correspondence" buttons provides a similar listing for those categories of information. Selection of the "Case Coordination" button provides all documents shared between cooperating users of the system (such as codefendants in a lawsuit) while selection of the "Executive Summary Reports" button provides an executive summary of the detailed information in the data covered by the summary categories. Selection of one of the "Search" options leads to a search of the Knowledge Kiosk database of the type selected and described for example with reference to FIGS. (8) through (14) below, while selection of the "Exit" button leads to an exit from the system. Depending on the particular user or the particular application or use for the Knowledge Kiosk, the combination of features available on the "Fast Tracks" page may change.

As shown for example in FIGS. (15A) through (15E), the "Favorites" page allows various user-defined folders to be set up to permit organization of the information most commonly used by that particular user. As shown in FIGS. (15A) and (15B) the basic folders predefined for every user are the "Root" folder, the "Forward" folder and the "Group" folder. The "Root" folder is the base folder into which all items appearing on the "Favorites" page are initially placed in the absence of any other defined folders. The "Forward" folder allows the information it contains to be forwarded to any other user authorized to have access to the highest security level information contained within the folder, in accordance with the security level classification set up for that type of information as described with reference to FIGS. (5) and (6) above. The "Group" folder provides segregation of the information it contains to permit automatic access by all users within the defined group once the information is placed within the folder by any user in that group. The remaining folders can be custom designed by the user to hold the types of information the user desires to place within those folders.

FIG. (16) shows an example of a user-defined "Presentation Queue" folder on the "Favorites" page which allows the user's retrieval of a Knowledge Element object from a Knowledge Kiosk contained in the database for "broadcast" display to all other authorized users via "The Show" button described with reference to FIG. (4). FIG. (16) lists three Knowledge Elements representing three different pieces of evidence produced in litigation that have been digitized and categorized for inclusion in the database as described above. The first Knowledge Element is a physical exhibit, the second is an article in a newspaper, and the third is a video deposition along with the deposition transcript. By placing these Knowledge Element objects in a user-defined "Presentation Queue" folder located on that user's "Favorites" page, the system can be used to "broadcast" the content represented by the digitized Knowledge Element(s) to multiple users in multiple locations anywhere in the world, simultaneously and in real-time if desired, as long as the recipient has been authenticated to receive the content of that Knowledge Element as described above. The digital nature of the stored Knowledge Element allows its content to be combined with any one or more other Knowledge Elements to create a multimedia presentation displaying the combined content, either audibly, visually, textually, or in any combination thereof. To do this, the "Passport" page of FIG. (3) is used to select the desired Knowledge Kiosk from which the Knowledge Element will be retrieved. For example, the Knowledge Element to be "broadcast" is retrieved by the sender through a search for "trial evidence" conducted from the "Fast Tracks" page for that Knowledge Kiosk as shown in FIG. (8A). The retrieved Knowledge Element is then placed in the sender's "Presentation Queue" folder as shown in FIG. (16) where its multimedia content can be "broadcast" to other authorized users by the sender's selection of "The Show" option from the screen of FIG. (16). Authorized recipients can then access the "broadcast" of that Knowledge Element by input of the sender's name upon selection of "The Show" button from the recipient's "Fast Track" page as shown in FIG. (4).

FIGS. (8A) through (8F) show examples of the various searches that can be conducted for retrieving a Knowledge Element from a particular Knowledge Kiosk. FIGS. (8A) and (8B) show a search conducted by the category or subcategory under which the Knowledge Element is classified in the Knowledge Kiosk database such as that shown in FIGS. (5) and/or (6). FIGS. (8C) and (8D) show a keyword search conducted by fields in the classification profile created for the Knowledge Element when it is entered into the database. FIG. (8E) shows a search conducted by an exhibit number associated with the Knowledge Element before it is classified and entered into the database, while FIG. (8F) shows a search conducted by the "knowledge element identification number" ("KEID") which is attached to the Knowledge Element as it is entered into the database. The exhibit number for a particular Knowledge Element may be re-used whereas the KEID is never re-used—it is unique to each individual Knowledge Element entered into the database, even if that particular Knowledge Element represents a document with the same exhibit number that has been entered into the database more than once (for a reason such as that described above). FIG. (9) shows an example of a "Knowledge Element Classification Profile" containing fields providing information describing and classifying the Knowledge Element. This information is entered into the "Knowledge Element Classification Profile" upon placement of the Knowledge Element within its Knowledge Kiosk, and it allows storage of that Knowledge Element within a database schema such as that shown in FIGS. (5) and/or (6) as well as retrieval of the Knowledge Element using all of the search techniques described herein. This information includes "metadata" as well as user-specific information classifying and describing that particular Knowledge Element. FIGS. (18A) through (18D) show examples of the results of various searches conducted on different types of information contained within the "knowledge element profile" of FIG. (9), such as document classification and type as shown for example in FIG. (18A), document originator as shown for example in FIG. (18B), document creation date as shown for example in FIG. (18C), and exhibit number as shown for example in FIG. (18D). FIGS. (19A) through (19C) show examples of the information contained in a "Knowledge Kiosk Journal" which provides different ways of tracking all user activity with respect to a given Knowledge Kiosk. Important to note is that the Knowledge Kiosk is being continuously and dynamically updated as new information is being entered, such that the same search conducted on the same criteria will yield the newly entered information as well as the pre-existing information fitting the search criteria, if the search is conducted after the new information has been entered.

FIGS. (11A) through (11D) show the results of an advanced boolean search conducted to locate a particular data string (in this example "Abd%alla") within any Knowledge Element in the Knowledge Kiosk of interest. As shown in FIG. (11A) the search is conducted in "all kiosk view" which causes a search of all Knowledge Elements within the Knowledge Kiosk of interest. FIG. (11B) lists all Knowledge Elements within the Knowledge Kiosk that contain this searched data string, while FIG. (11C) shows the stored digital image (with the searched string highlighted) of a Knowledge Element that is selected from the list. As shown in FIG. (11A) and explained in FIG. (11D), such a search can be conducted to accommodate "fuzziness" within the digitized version of a given Knowledge Element so that the search will provide a level of forgiveness in retrieving results that do not exactly match the search request, due to potential errors in the request or inaccuracies caused in digitizing the knowledge element (in this case the "%"

constitutes an error in the searched string "Abd%alla" that does not impact the retrieval of valid results which disregard the error).

FIGS. (12A) through (12E) show an example of a classification conducted on documents to be produced in litigation that have already been entered as Knowledge Elements (and assigned a KEID) within a Knowledge Kiosk related to the litigation. FIG. (12A) shows the Knowledge Element digital image of a document to be produced in the litigation, while FIG. (12B) shows an example of the options available for classifying portions of the document in order to determine if (and how) it should be produced (i.e., "Privileged", "To Be Produced", "Foreign Language", "Non-Responsive", ect.) FIGS. (12C) and (12D) show a classification history for the document which enables the tracking of changes made to the classification (and to those specific portions of the document in which the classification has been changed) to allow a historical review of the work done on the document. Finally, FIG. (12E) shows the most current classification information for the document, including the status of its production in the litigation (i.e., "To Be Produced"), the security level under which it is to be treated (i.e., "Confidential"), the pages classified (i.e., "Pages 1–2") and the kiosk user creating the classification (i.e., "W.West"). This information is stored in the Knowledge Element profile for the document in order to enable later searching and retrieval of the document according to classification status using any of the search methods described herein. FIGS. (13A), (13B) and (14) show an example of searches that can be conducted on the classifications created by the user with the options shown for example in FIGS. (12A) through (12E). FIG. (7) shows an example of a submission form completed by the user for storage of an item of information (such as a document to be produced in litigation) within a selected Knowledge Kiosk.

FIGS. (17A) through (17C) show a Knowledge Element retrieved using the "Knowledge Element Viewer" which allows a conventional software module (or "plug-in") for manipulating combined textual/graphical files (such as Adobe Acrobat) to be used to extract relevant data from the Knowledge Element for use in the multimedia presentations described with reference to FIGS. (10) and (20). FIGS. (10A) through (10D) show an example of an advanced search designed to retrieve a multimedia rendering of a statement of particular interest made in a videotaped deposition. FIG. (10A) shows a search conducted by Knowledge Element category/classification ("trial evidence"/"deposition video") which reveals all Knowledge Elements containing video of the selected deponent ("William Crabbe") that is to be used as trial evidence. From these results, a further search is conducted in FIG. (10B) to retrieve those portions of the deposition video and associated transcript where the deponent made the specific statement of interest (i.e., " . . . wait 11 months . . . "), the results of which are shown in FIG. (10C). Upon "click on" selection of the search results in FIG. (10C), a portion of the deposition transcript text containing the statement of interest is revealed as shown in FIG. (10D), where the viewer is led directly to the page and line number(s) where the statement of interest is highlighted. The textual portion of the deposition transcript containing the highlighted statement of interest shown in FIG. (10D) can be combined with the videotaped presentation of the statement shown in FIG. (20) to form a multimedia Knowledge Element (distinct from both the Knowledge Element containing the textual statement and the separate Knowledge Element containing the videotaped statement). This allows the combination of different Knowledge Elements together to provide a three-dimensional (3-D) multimedia presentation; comprising for example a videotaped deposition, the textual rendering of that deposition, and potentially a physical exhibit (such as a document authored by the deponent) that was introduced in the deposition and was being discussed in the portion of the transcript that is of interest.

The classification searches conducted for example in FIGS. (13A), 13(B) and (14) can be used in combination with a "Bulletin Board" page as shown for example in FIG. (21) to permit real-time multi-user interaction to dynamically select and change the use of different Knowledge Elements for multimedia presentations like those shown in FIG. (20) based on changing circumstances caused by the live testimony presented during trial. The powerful impact of viewing the videotape and text of the deposition statement (in combination with each other and with the piece of physical evidence being discussed) is compounded by the ability to make such a multimedia presentation available on-demand by authorized users anywhere in the world, such as for example in conducting a real-time impeachment of the deponent using the multimedia presentation while the deponent is on the witness stand testifying at trial.

While the invention has been described in connection with what are presently considered to be the preferred embodiments, it is to be understood the invention is not to be limited to the disclosed embodiments, but on the contrary is intended to cover various modifications and equivalent arrangements included within the spirit and scope of the appended claims.

What is claimed is:

1. A system for utilizing audible, visual and textual data with alternative combinable multimedia forms of presenting information to provide real-time interactive knowledge management in support of activities conducted simultaneously by multiple users in different remote locations, comprising receiving, accessing, processing, storing, retrieving, transmitting and utilizing said data to provide said knowledge management over a distributed network of computers, further comprising:

(a) library science means for categorizing said data wherein said categorizing creates a classification profile for at least one element of said data, said profile containing fields of information describing and classifying said element;

(b) linguistics means for defining information acquisition, exchange and workflow to permit said categorization;

(c) database means for storing said data elements according to a schema which implements said categorization;

(d) media production means for representing said data elements in multimedia audible, visual and textual data in digital forms; and (e) computer software means for implementing said system over a computer network to permit interactive, multidirectional, multimedia digital data communications originated by a user from at least one first location and made available to at least one second location.

2. A method of using a system for utilizing audible, visual and textual data with alternative combinable multimedia forms of presenting information to provide real-time interactive knowledge management in support of activities conducted simultaneously by multiple users in different remote locations, comprising receiving, accessing, processing, storing, retrieving, transmitting and utilizing said data to provide said knowledge management over a distributed network of computers, wherein said method comprises:

(a) categorizing said data wherein said categorizing creates a classification profile for at least one element of said data, said profile containing fields of information describing and classifying said element utilizing library science techniques;

(b) defining information acquisition, exchange and workflow to permit said categorization utilizing linguistics techniques;

(c) storing said data elements in a database according to a schema which implements said categorization;

(d) representing said data elements in multimedia audible, visual and textual data in digital forms utilizing media production methods; and (e) implementing said system over a computer network using computer software which permits interactive, multidirectional, multimedia digital data communications originated by a user from at least one first location and made available to at least one second location.

3. The system of claim 1 or 2 wherein said database schema provides multiple levels of restricted access to said managed information.

4. The system of claim 3 wherein at least some of said elements are included within at least one category, wherein said category has at least one subcategory implementing said database schema such that said category includes all of the information included in each subcategory associated with said category.

5. The system of claim 4 wherein an element in each category or subcategory is retrievable independent of the information in any other category or subcategory.

6. The system of claim 5 wherein elements containing a common characteristic are retrievable from at least two different categories or subcategories.

7. The system of claim 6 wherein the user accesses said categories or subcategories of information from an internet web page having access through a web server to said database.

8. The system of claim 7 wherein said web page contains at least one user executable feature for:

(a) providing access to the most common or most recent information used within a category or subcategory;

(b) retrieval and processing of said data for presentation in each form in which said data is used;

(c) storing the information most commonly used by said user according to a categorization established by said user;

(d) selecting an audible, visual and/or textual broadcast of a designated element of said data according to a selected multimedia format;

(e) combining an element with at least one other element for presentation in at least one broadcast;

(f) searching each category or subcategory for at least one said element; or (g) combinations thereof.

9. The system of claim 8 wherein said element of subpart (d) or elements of subpart (e) are presented in a combination of audible, visual and/or textual multimedia forms in said broadcast.

10. The system of claim 8 wherein said elements of subpart (e) are combinable into different audible, visual and/or textual multimedia forms in said broadcast.

11. The system of claim 8 wherein said search of subpart (f) is conducted by a match of:

(a) data contained within said item;

(b) identification information for said item;

(c) classification information for said item;

(d) natural language terms;

(e) Boolean operators;

(f) one or more keywords; or (g) combinations thereof.

12. The system of claim 8 wherein said search of subpart (f) accommodates inaccuracies created by the search request or digitization of said item.

13. The system of claim 1 or 2 wherein a single element of said data is stored in at least two different locations of said database when said element has been altered from its original form such that each different form of said element is stored in a different location.

14. The system of claim 13 wherein a single element of said data is referred to by more than one designation such that each said designation enables a reference to at least one other designation for said element.

15. The system of claim 1 or 2 wherein said data is continuously and dynamically added or updated by one or multiple said users.

* * * * *